United States Patent [19]
Wright

[11] Patent Number: 4,751,740
[45] Date of Patent: Jun. 14, 1988

[54] APPARATUS, METHOD, AND STRUCTURE FOR TRANSLATING A DOCUMENT HAVING ONE STRUCTURE INTO A DOCUMENT HAVING ANOTHER STRUCTURE

[75] Inventor: Terence J. Wright, Tyngsboro, Mass.

[73] Assignee: Wang Laboratories, Inc., Lowell, Mass.

[21] Appl. No.: 679,675

[22] Filed: Dec. 10, 1984

[51] Int. Cl.[4] ............................................. G06K 9/00
[52] U.S. Cl. ....................................... 382/1; 364/518; 364/900; 382/61
[58] Field of Search ...................... 382/1, 61; 364/518, 364/523

[56] References Cited

U.S. PATENT DOCUMENTS

| | | | |
|---|---|---|---|
| 4,435,766 | 3/1984 | Haber et al. | 364/200 |
| 4,435,778 | 3/1984 | Cason et al. | 364/900 |
| 4,532,588 | 7/1985 | Foster | 364/200 |
| 4,573,192 | 2/1986 | Roth et al. | 382/61 |

OTHER PUBLICATIONS

Office Information Architecture: Concepts, GC23-07-65-0, First Edition, IBM, 1983 pp. 1-1 to 2-3.
Document Content Architecture: Revisable-Form-Text Reference 5C23-0758-0, First Edition, IBM, 1983, pp. 15-26.
Joan E. Knoerdel, Shirley Ward Watkins, Document Interchange Format, Institute for Computer Sciences and Technology, National Bureau of Standards, U.S. Department of Commerce, Feb. 1984, pp. 1-6, 11.
V. Joboloff, Theo Schleich, Introduction to Interscript, Xerox Corp., Dec. 4, 1984, pp. 55-62.
R. M. Ayers, Interscript Document Interchange Standard Concepts and Facilities, Xerox Corp., Dec. 1983, sections 6-11.
I. R. Campbell-Grant, Peter J. Robinson, Office Document Architecture, 6th Working Draft, ECMA, 30 May 1984, pp. 68-92.
M. Zisman, Good Fits, Bad Fits and Misfits, Computer World, 1/21/85, pp. ID/1-ID/12.
Document Context Architecture: Revisable-Form-Text Reference, SC23-0758-0, IBM, 1983, pp. 179-184.
B. Reid, Scribe . . . , Thesis CMU-CS-81-100, Carnegie-Mellon University 1980, pp. 41-46, 49.

*Primary Examiner*—Leo H. Boudreau
*Attorney, Agent, or Firm*—Michael H. Shanahan; Gordon E. Nelson

[57] ABSTRACT

Method, apparatus, and document structure used to translate a document having one structure into a document having another structure. A document having the first structure is translated into an equivalent document having an intermediate structure, and the document having the intermediate structure is translated into an equivalent document having the second structure. The intermediate document structure is sequential, and translation from the document having the intermediate structure to the document having the second structure may begin before the translation from the document having the first structure to the document having the second structure is complete. The sequential document structure consists of segments representing components of the document. If a given component is dependent from another component, the dependent component is nested within the component it is dependent from. The entire document is represented by a segment in which all segments representing components are nested. Other structures in the intermediate document structure represent attributes applying to sections of the document text and items such as line ends, tabs, and indentations.

57 Claims, 12 Drawing Sheets

DOCUMENT STRUCTURE TRANSLATION IN THE PRESENT INVENTION

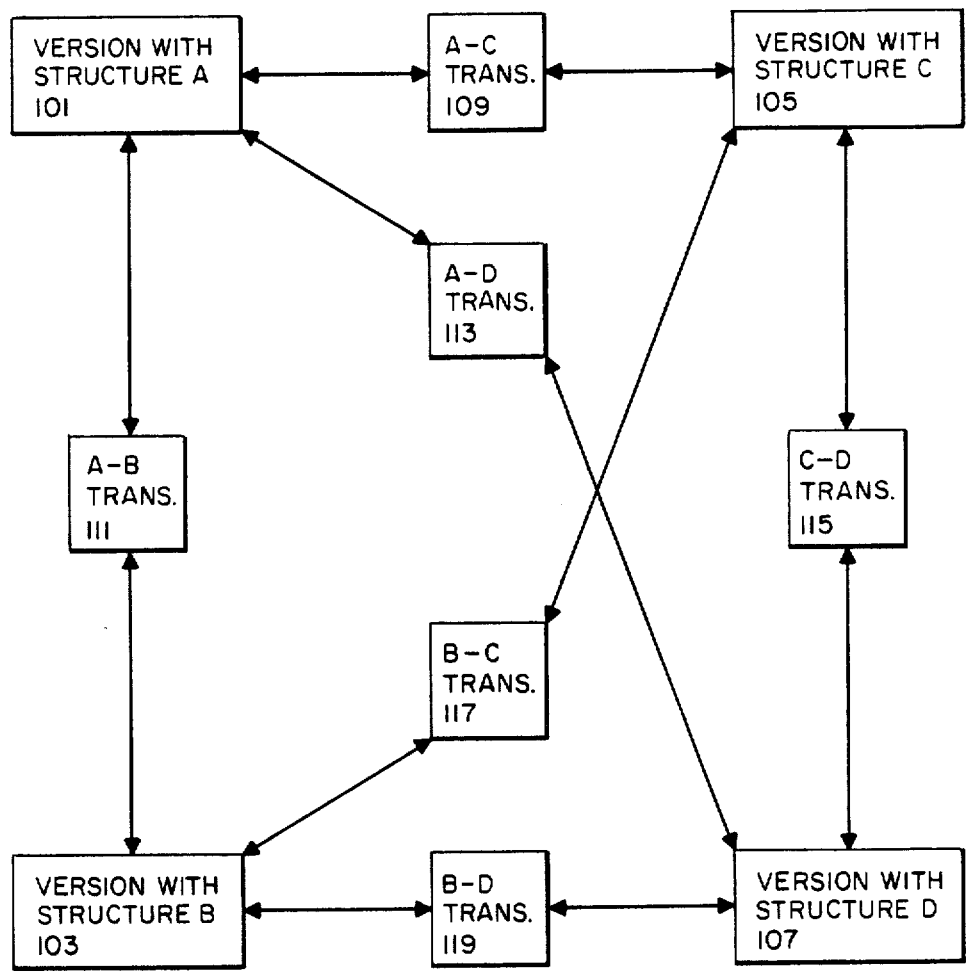
FIG. 1: PRIOR-ART DOCUMENT STRUCTURE TRANSLATION

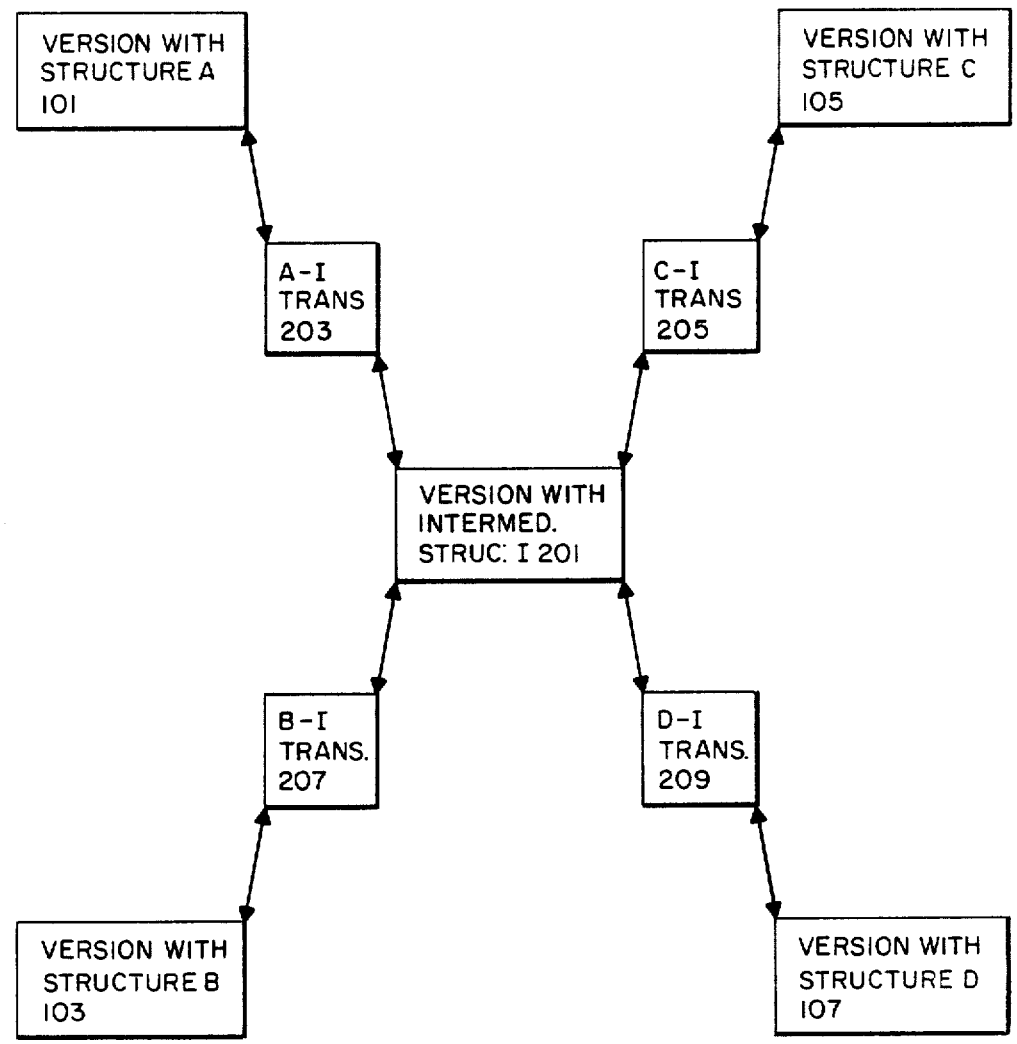
FIG. 2 DOCUMENT STRUCTURE TRANSLATION IN THE PRESENT INVENTION

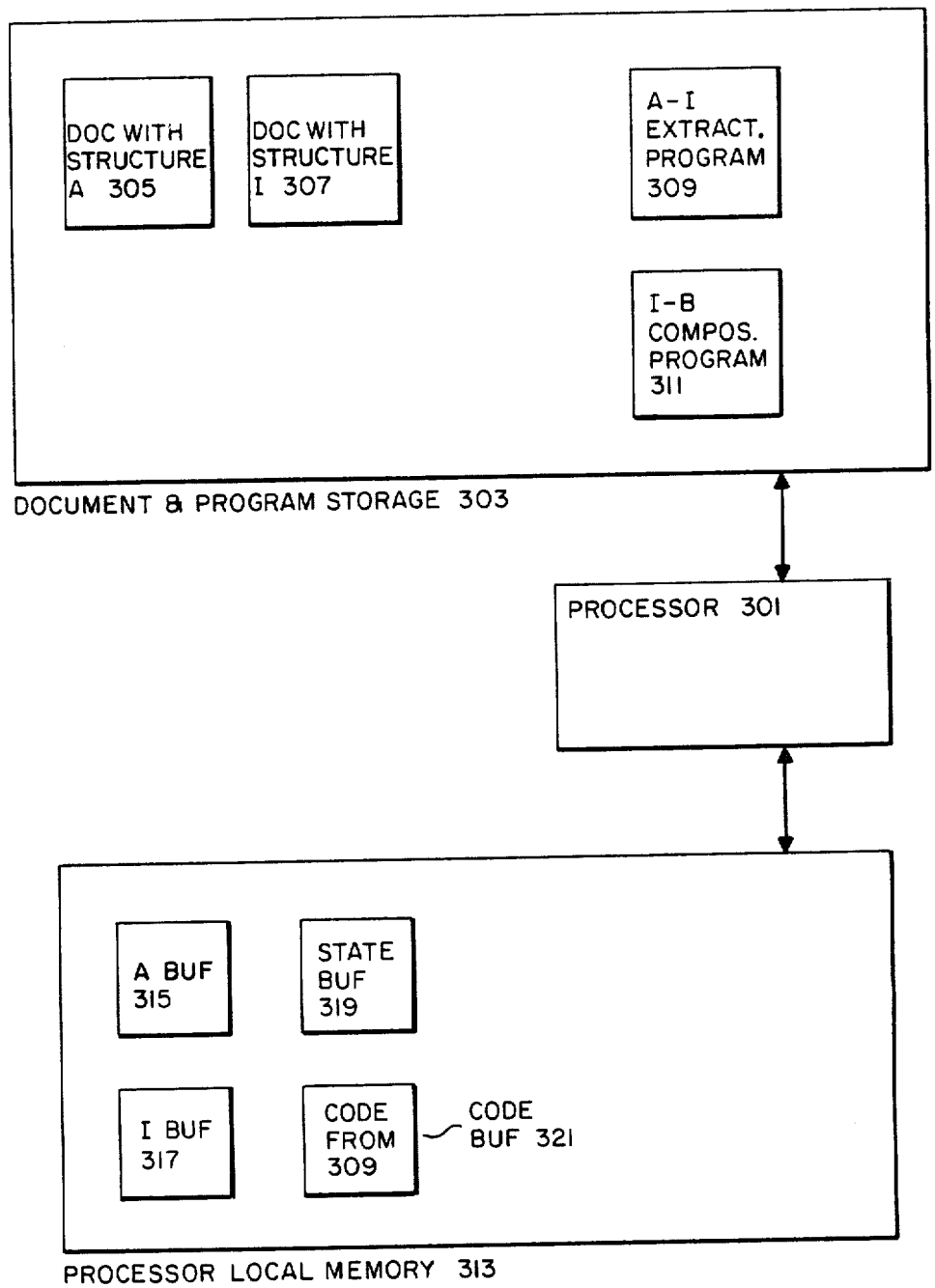
FIG. 3: DOCUMENT TRANSLATION SYSTEM DURING TRANSLATION FROM SOURCE STRUCTURE TO INTERMEDIATE STRUCTURE

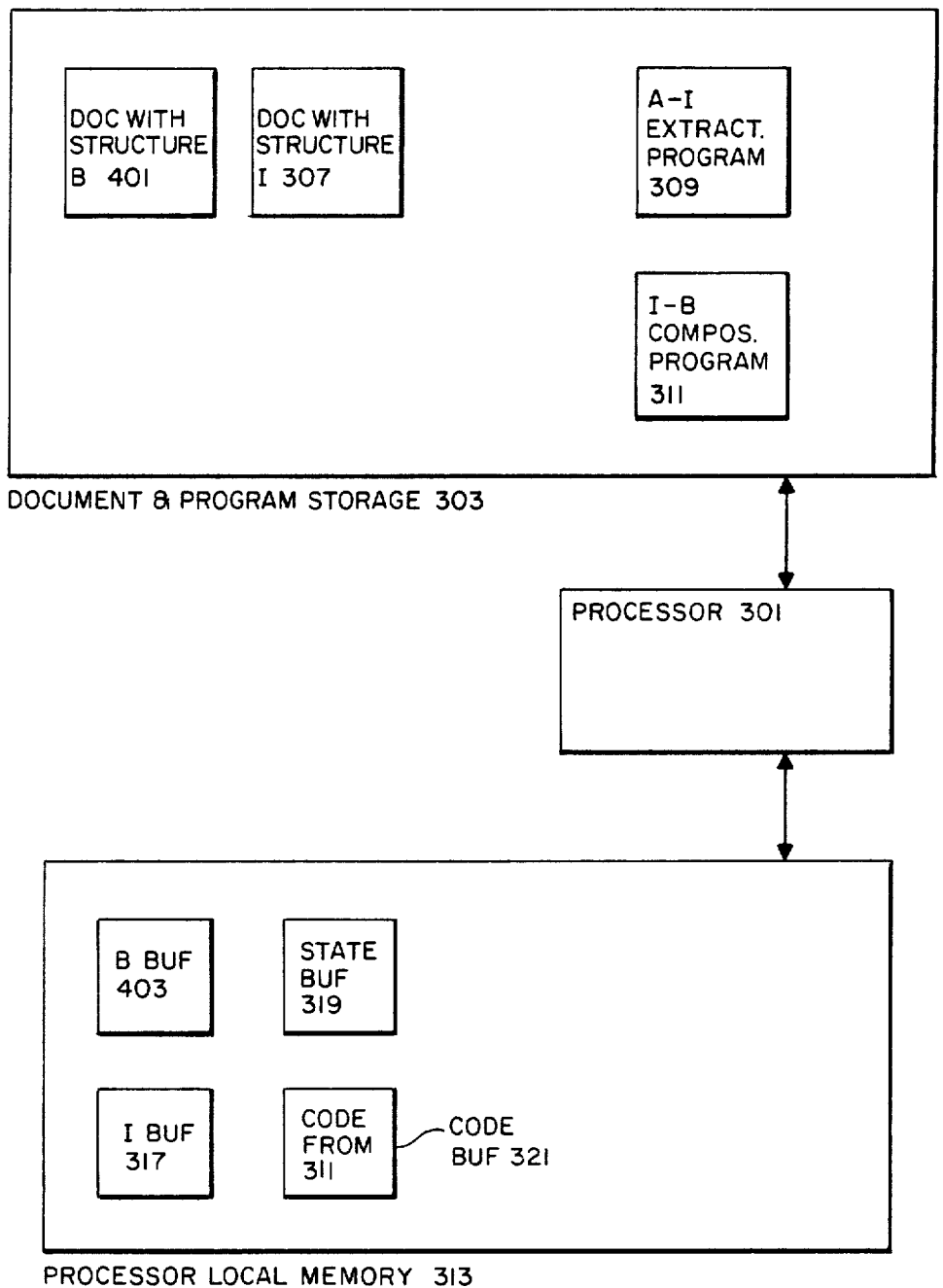
FIG. 4: DOCUMENT TRANSLATION SYSTEM DURING TRANSLATION FROM INTERMEDIATE STRUCTURE TO DESTINATION STRUCTURE

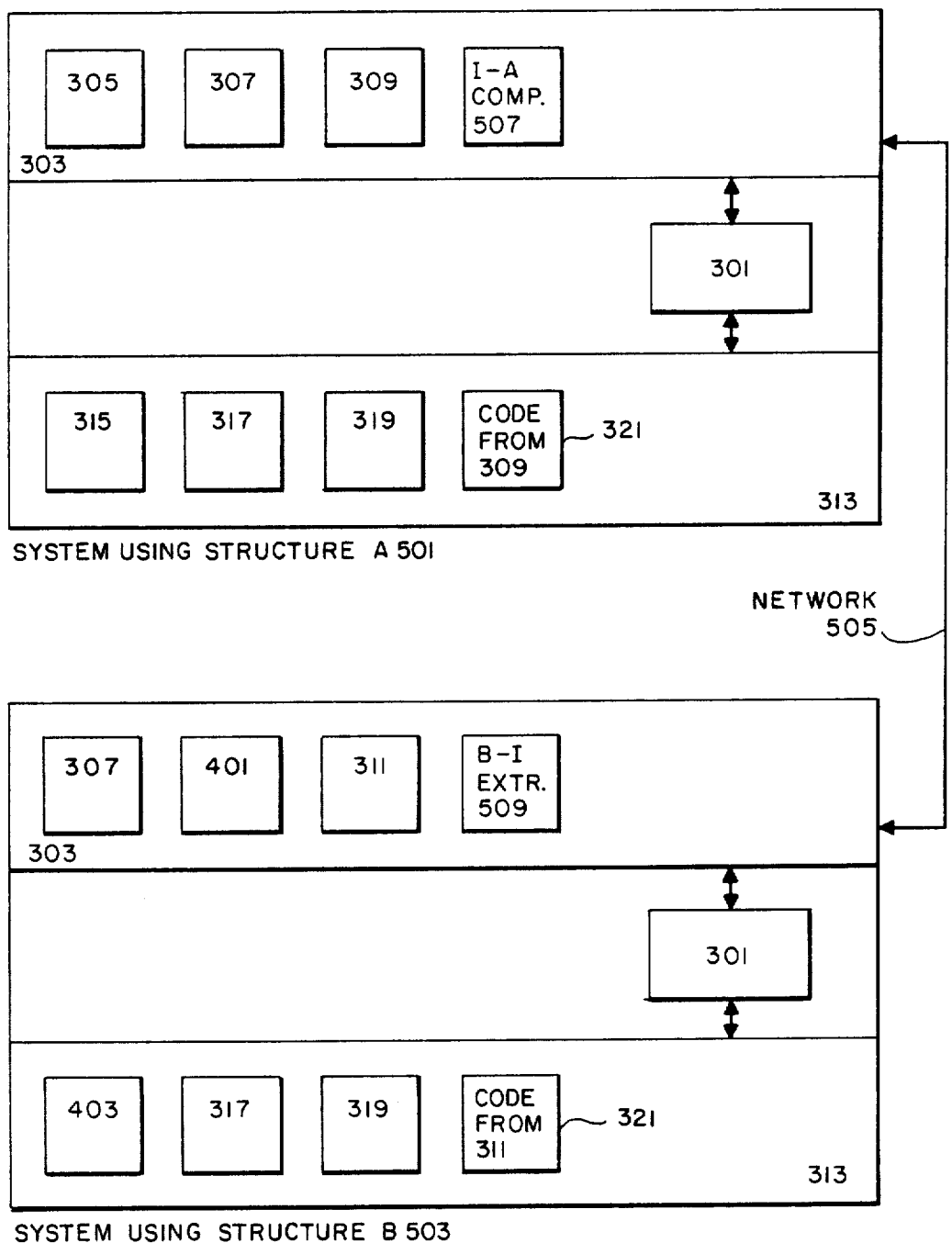
FIG. 5: DOCUMENT TRANSLATION SYSTEM IN A NETWORK

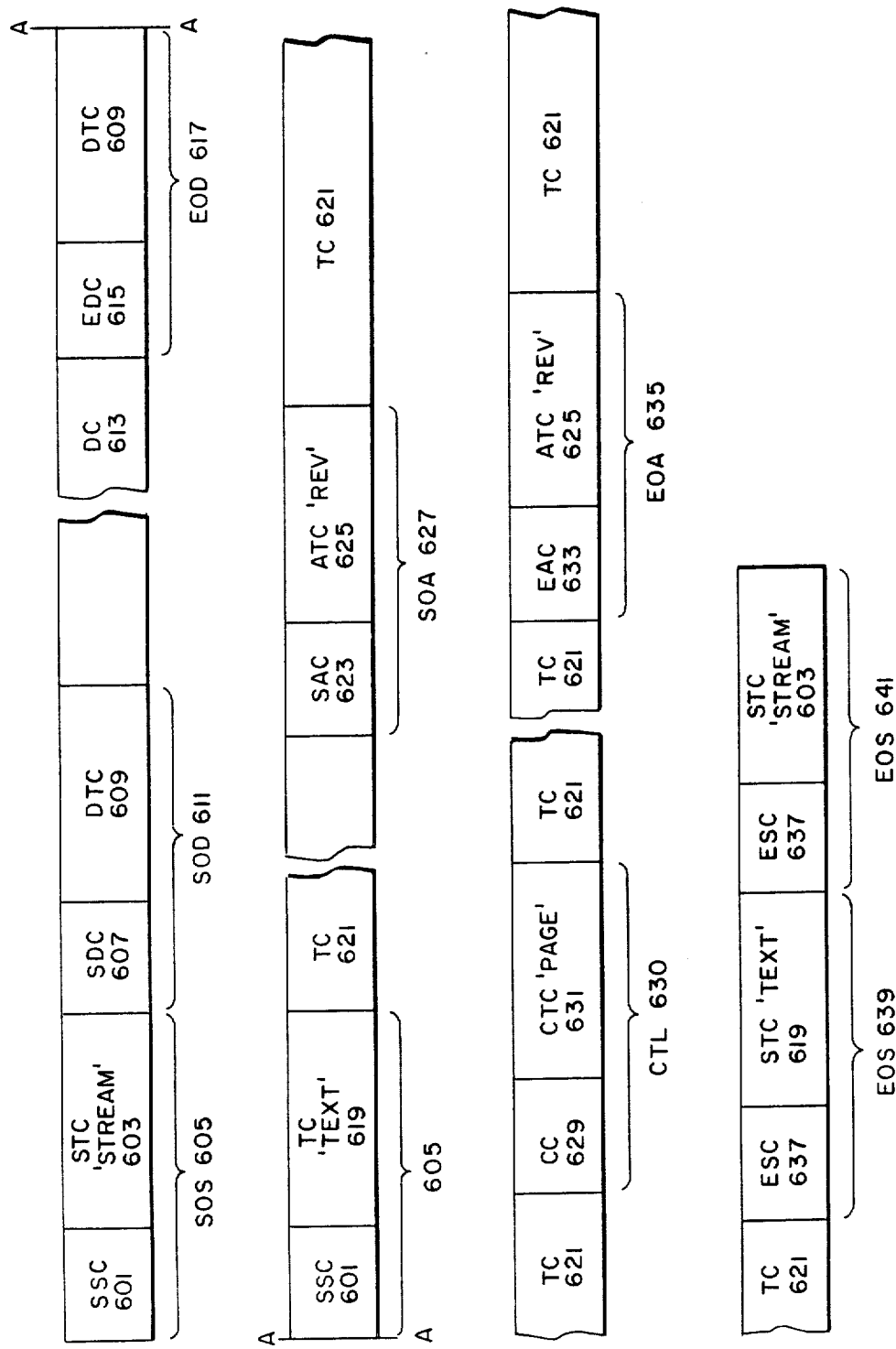
FIG. 6: INTERMEDIATE DOCUMENT STRUCTURE OVERVIEW

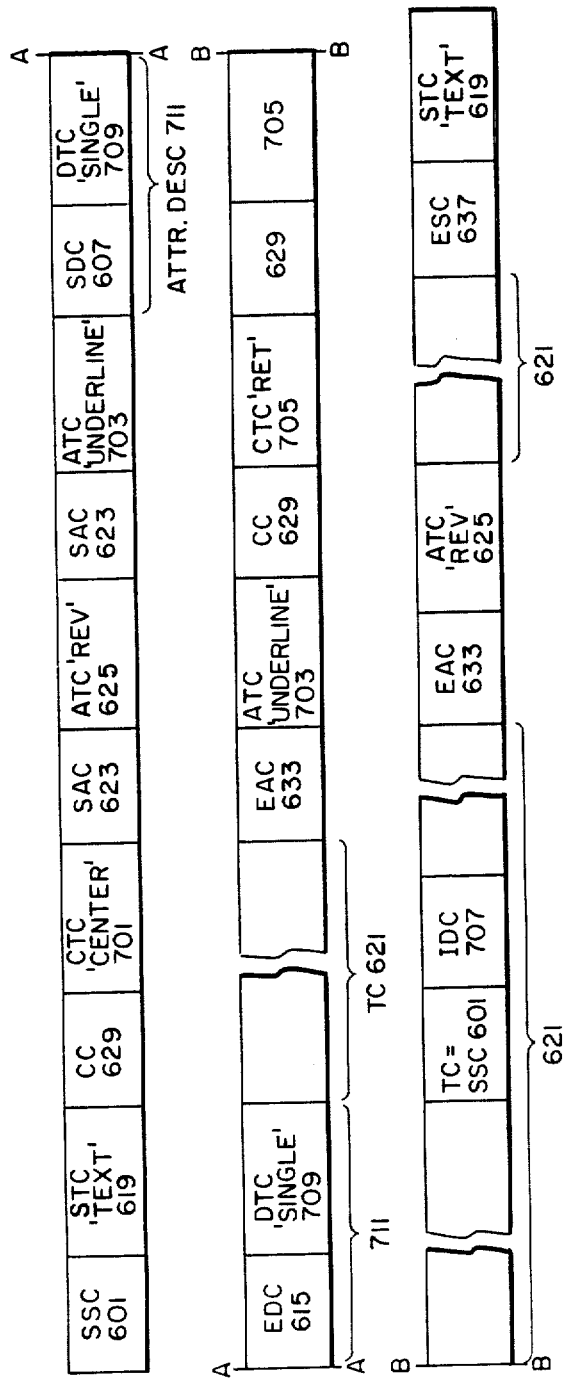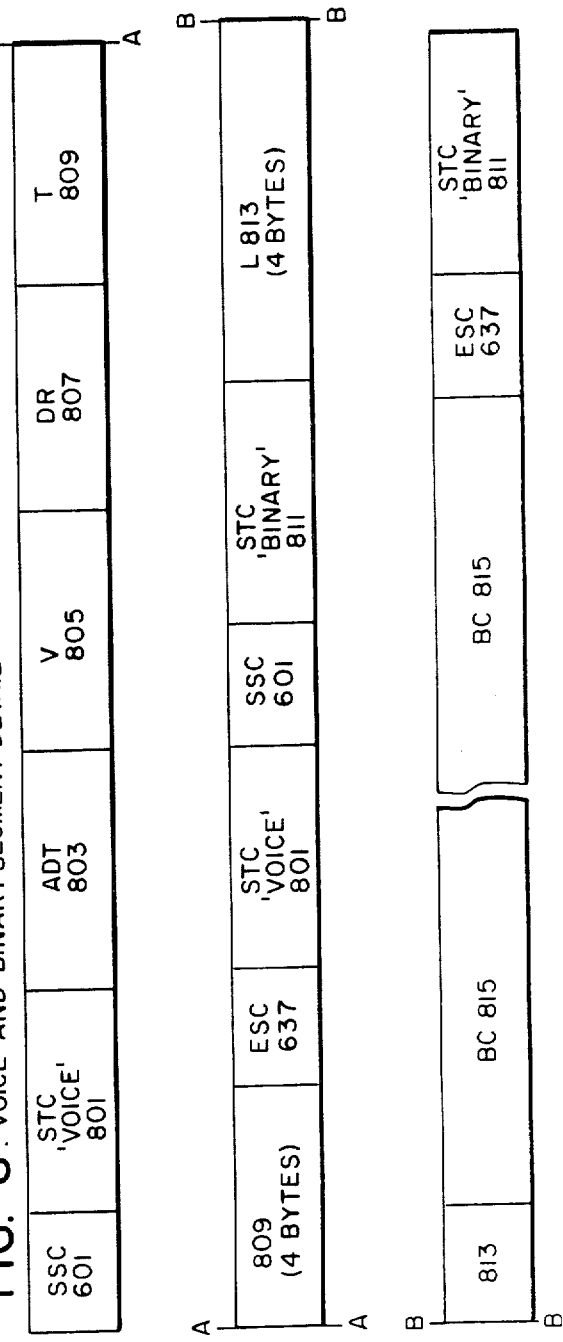
FIG. 7: TEXT SEGMENT DETAIL
FIG. 8: VOICE AND BINARY SEGMENT DETAIL

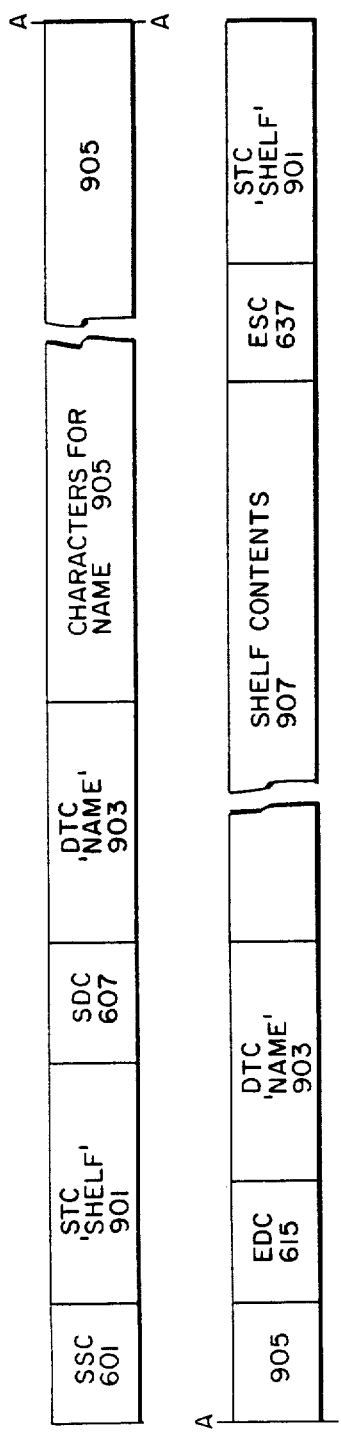
FIG. 9: NAMED TEXT SHELF SEGMENT
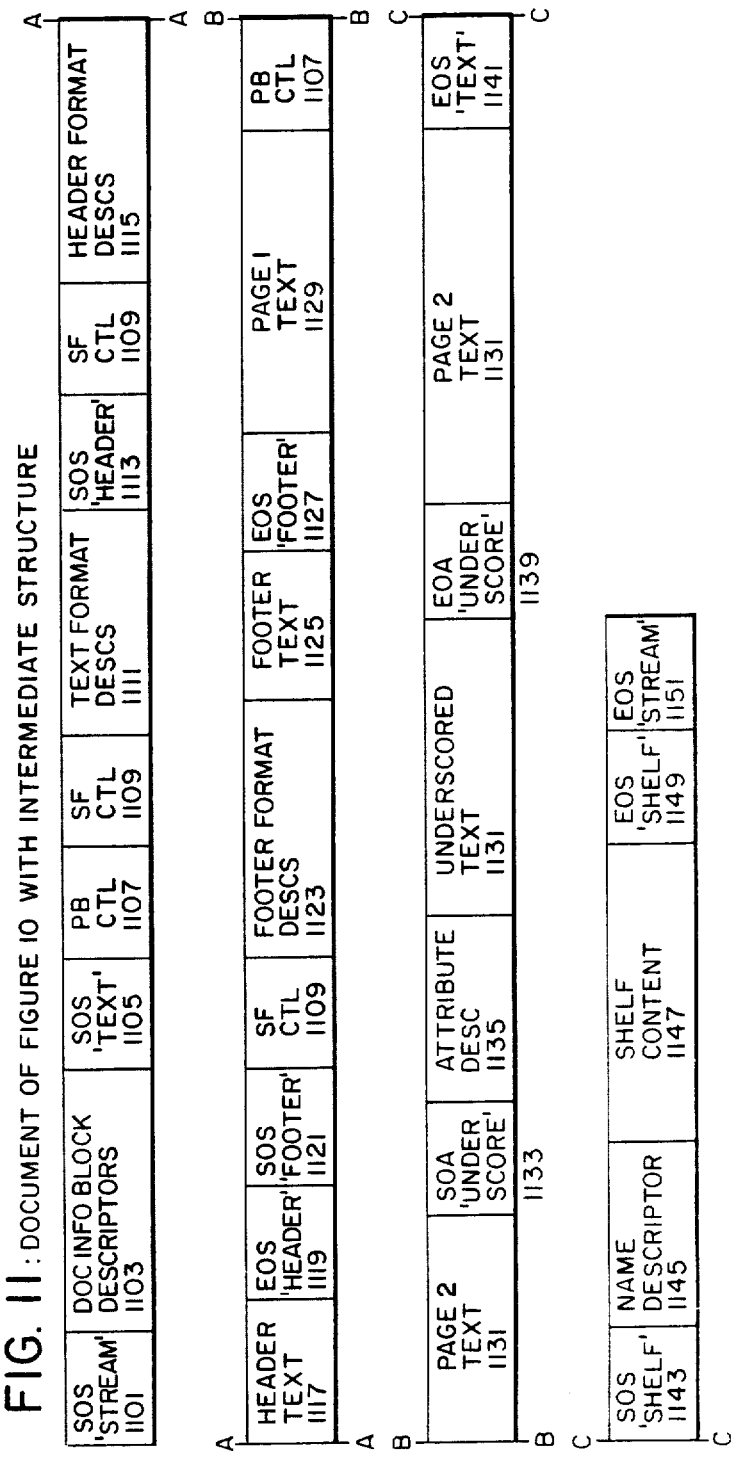
FIG. 11: DOCUMENT OF FIGURE 10 WITH INTERMEDIATE STRUCTURE

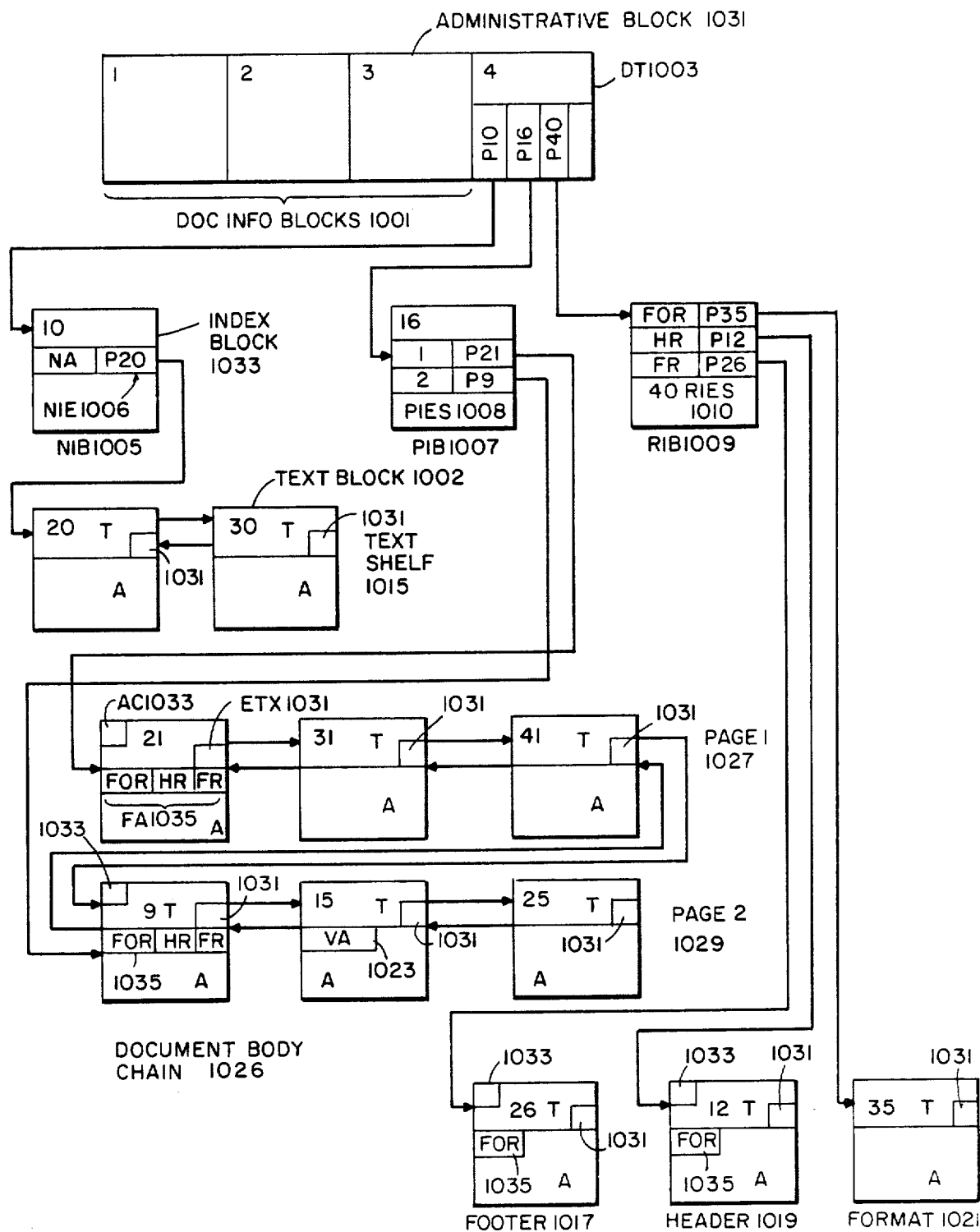
FIG. 10: DOCUMENT WITH PRIOR-ART STRUCTURE

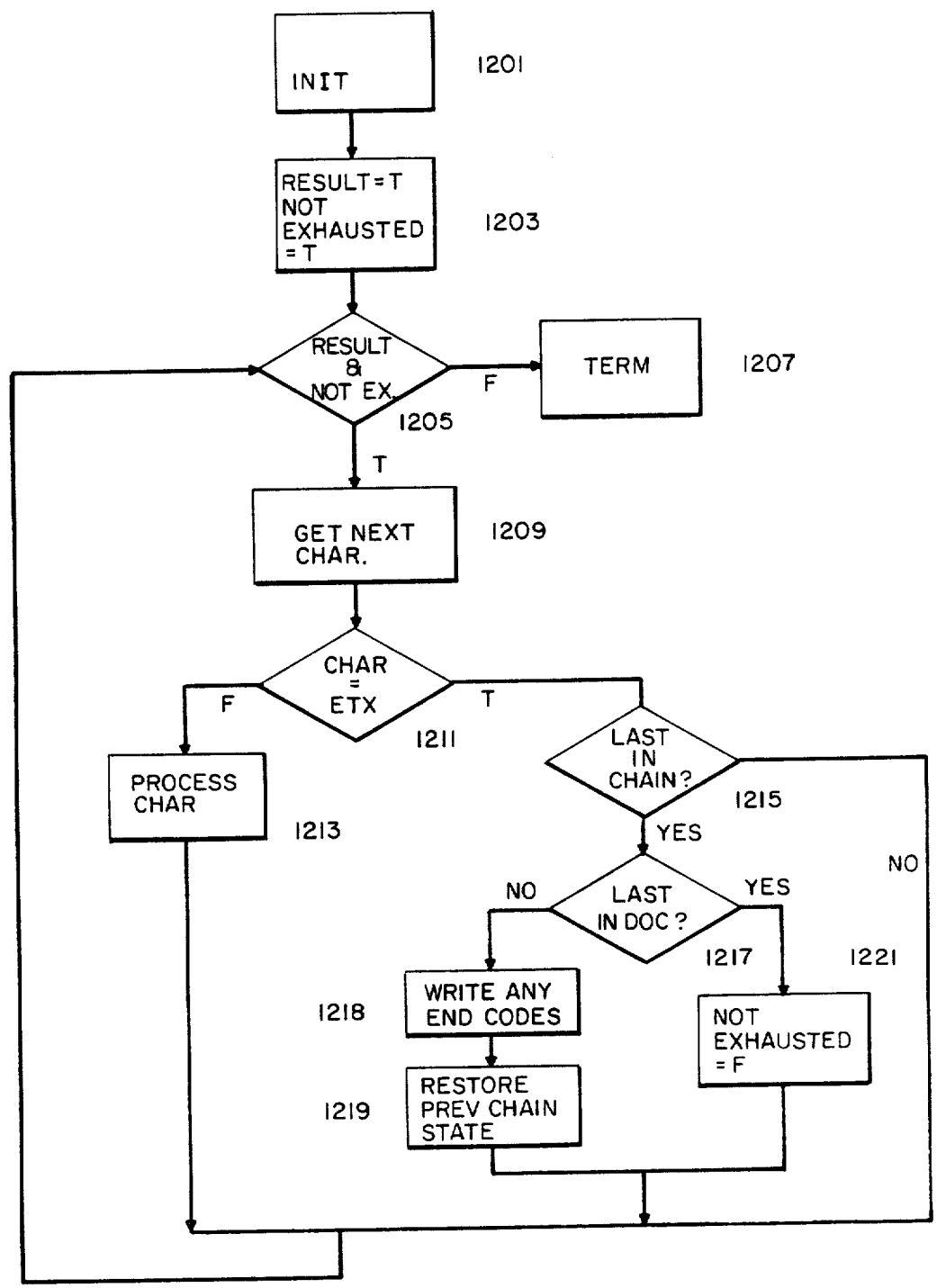
FIG. 12 : MAIN TRANSLATION LOOP

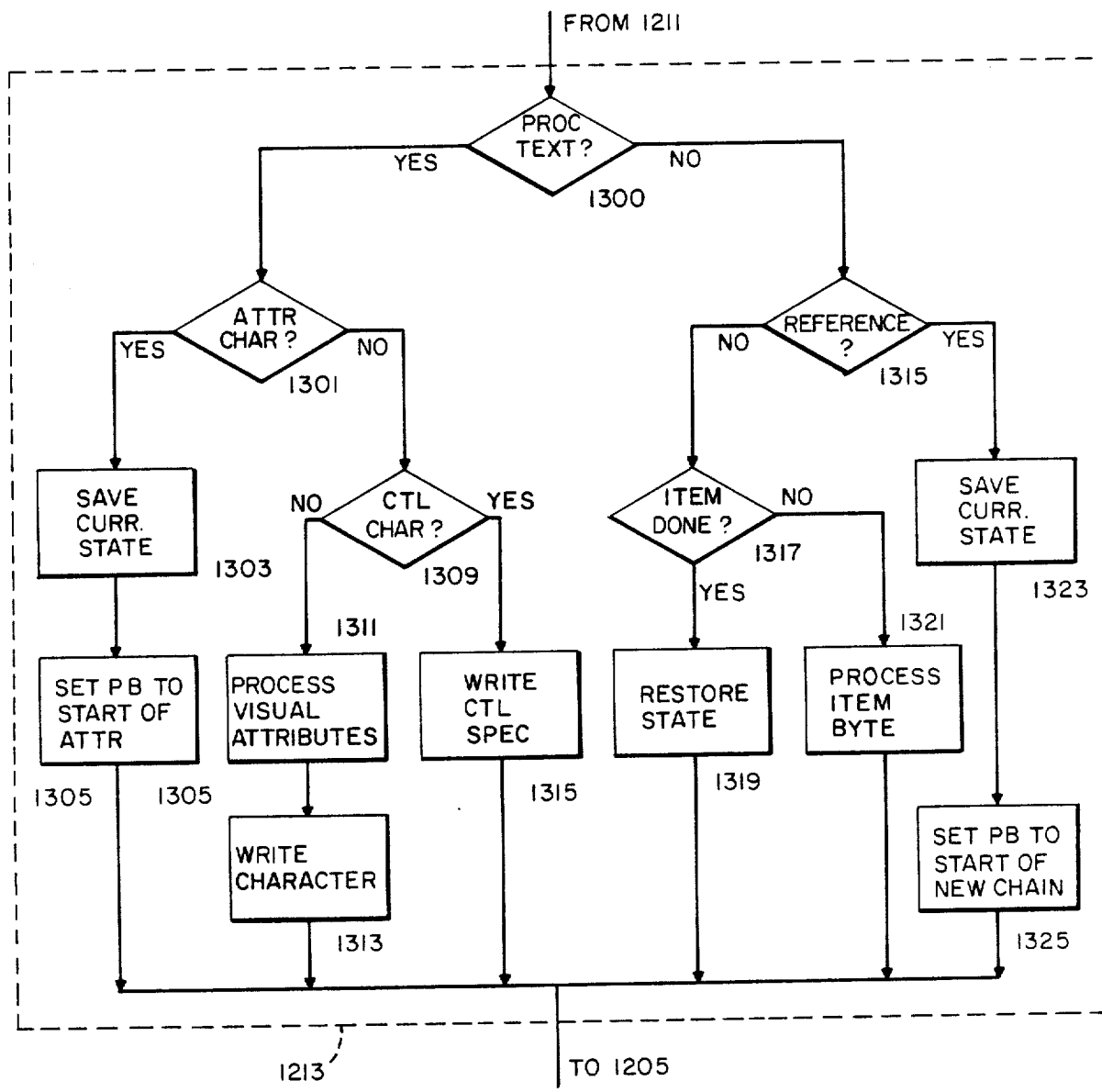
FIG. 13: DETAIL OF PROCESS CHAR 1213

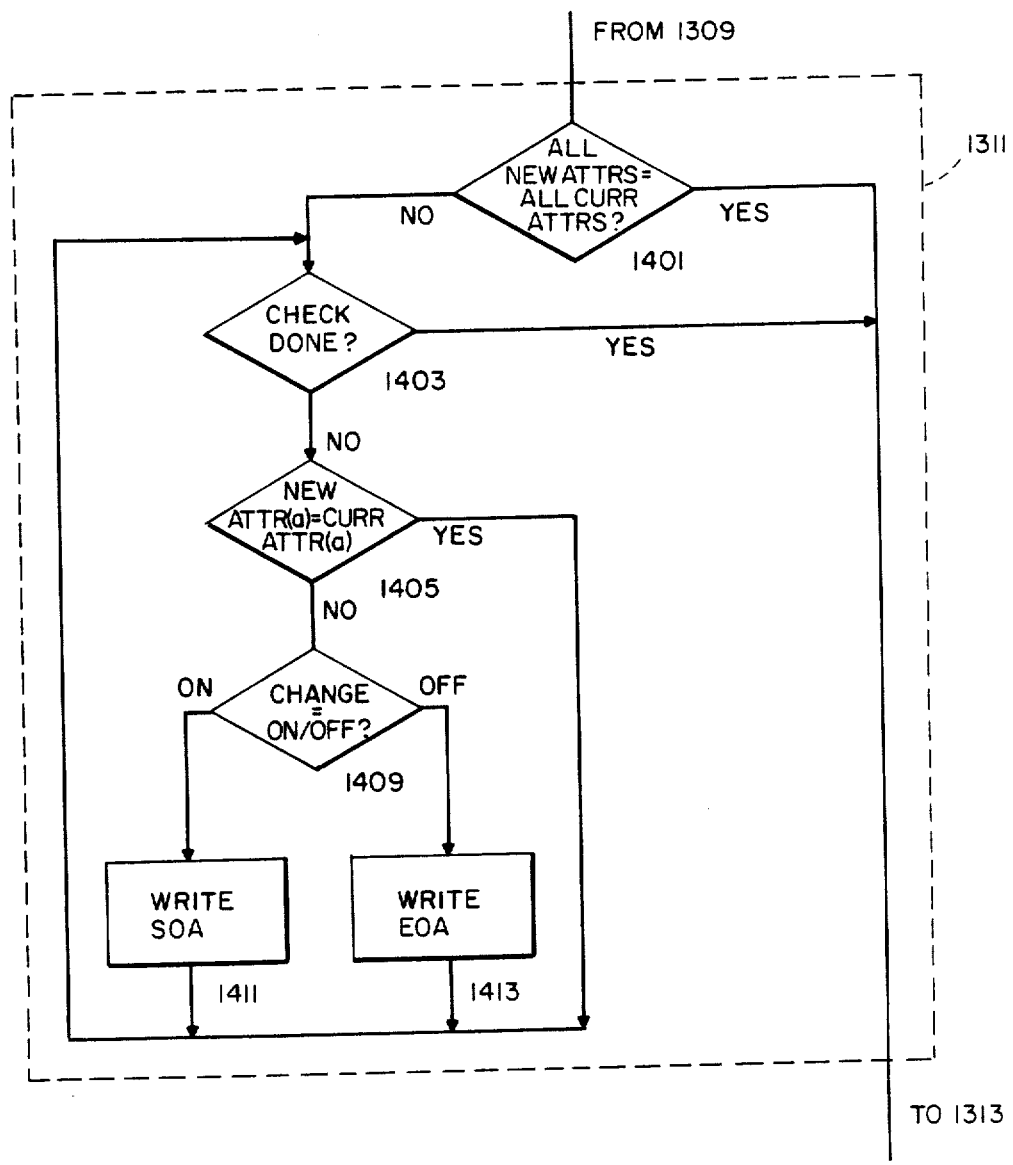
FIG. 14: ATTRIBUTE PROCESSING DETAIL

APPARATUS, METHOD, AND STRUCTURE FOR TRANSLATING A DOCUMENT HAVING ONE STRUCTURE INTO A DOCUMENT HAVING ANOTHER STRUCTURE

BACKGROUND OF THE INVENTION

1. Field of the Invention

The present invention relates to structures used for documents in data and word processing systems and more particularly to apparatus, methods, systems, and structures used to translate a document having one structure into an equivalent document having another structure.

2. Description of the Prior Art: FIG. 1

Documents may be written and processed using many different kinds of data processing or word processing systems. Documents processed using a given system have a document structure specific to that system. Thus, if a document is to be processed first on one system and then on another, it must be translated from a document having the structure required for the first system into a document having the structure required for the second system. In the prior art, translation from one structure to another was accomplished by writing a translation program specific to the two structures. The consequences of this approach are shown in prior-art FIG. 1. In that Figure, there are represented four versions of a document, version 101 having structure A, version 103 having stucture B, version 105 having structure C, and version 107 having structure D. Six programs, represented by the boxes labelled 109, 111, 113, 115, 117, and 119, are necessary to permit translation of a version having any one of the structures into a version having any of the other structures. As further structures are added, the number of translation programs required increases disproportionately. If all translations may be made in either direction, the number of translation programs N required for a number of structures n is expressed by $N=(n-1)+(n-2)+..+(n-(n-1))$. Moreover, in order to write each of the translation programs, a detailed knowledge of both document structures is required. That requirement is disadvantageous in two respects. First, if translation programs are to be provided for any considerable number of structures, the programmer must spend a great deal of time studying the structures. Second, where one of the document structures is confidential and proprietary to one manufacturer and the other is confidential and proprietary to another, the knowledge required to write a translation program for the structures may be unobtainable.

SUMMARY OF THE INVENTION: FIG. 2

The present invention solves the problem just described by providing an intermediate document structure for use in document translation. As shown in FIG. 2, translation from a document having a first structure into a document having a second structure is accomplished by translating the document having the first structure into a document having an intermediate structure and then translating the document having the intermediate structure into a document having the second structure. Thus, Version 101 of the document is translated into Version 103 of the document by using A-I translator 203 to translate Version 101 into Version 201 having the intermediate structure and then using B-I translator 207 to translate Version 201 into Version 103.

As may be seen from FIG. 2, when translation is done via a Version 201 having the intermediate structure, only as many translation programs are required as there are document structures other than the intermediate structure. Thus, for the four structures A, B, C, and D represented in FIG. 2, 4 programs, A-I translator 203, C-I translator 205, B-I translator 207, and D-I translator 209, are required instead of the 6 programs of the prior art. Since the number of programs required in the prior art increases disproportionately as the number of document structures, increases, the present invention is particularly advantageous when a large number of different document structures must be dealt with.

Further advantages of the present invention stem from the fact that each program translates between a single structure and the intermediate structure. Thus, a programmer writing a translation program need only understand two structures: the one he is immediately concerned with and the intermediate structure. Moreover, since translation between confidential document structures can be achieved by translating from the first confidential structure to the intermediate structure and then from the intermediate structure to the second confidential structure, there is no need to disclose confidential structures as long as all programmers know and understand the intermediate structure.

The present invention is particularly valuable when a number of word or data processing systems utilizing different document structures are connected by means of a network. In the absence of an intermediate structure, a variety of document structures must be transferred over the network; when an intermediate structure is available, all documents may be translated into the intermediate structure before being placed on the network, and the network need only deal with the intermediate structure.

The intermediate structure used in a preferred embodiment of the invention has a sequential structure, i.e., one in which the logical relationships of the components of the document to one another are represented by the locations of the components relative to each other in the document structure. Because the structure is sequential, there is no need for a translation of a document into the intermediate structure to be complete before translation from the intermediate structure into the target structure begins. Thus, in a network, the intermediate structure may be transmitted over the network as it is produced and translated into the target structure as it is received.

It is thus an object of the invention to provide an improved data or document processing system.

It is another object of the invention to provide an improved method and improved apparatus for translating a document having one structure into an equivalent document having another structure.

It is an additional object of the invention to provide a document structure particularly adapted to use in translating documents.

It is a further object of the invention to provide a sequential document structure for use in networked systems.

It is yet another object of the invention to provide a sequential document structure wherein components dependent from other components are nested within the components they are dependent from.

It is a further additional object of the invention to provide an expandable sequential document structure.

Other objects and advantages of the present invention will be understood by those of ordinary skill in the art after referring to the detailed description of a preferred embodiment and the drawings, wherein:

BRIEF DESCRIPTION OF THE DRAWINGS

FIG. 1 is a block diagram of prior-art translation of document structures.

FIG. 2 is a block diagram of translation of document structures in the present invention.

FIG. 3 is a block diagram of a document translation system during translation from a source structure to an intermediate structure.

FIG. 4 is a block diagram of a document translation system during translation from an intermediate structure to a target structure.

FIG. 5 is a block diagram of a document translation system in a network.

FIG. 6 is an overview of the intermediate document structure of the present invention.

FIG. 7 is a detail of a text segment in the intermediate document structure of the present invention.

FIG. 8 is a detail of voice and binary segments in the intermediate document structure of the present invention.

FIG. 9 is a detail of a named text shelf segment in the intermediate document structure of the present invention.

FIG. 10 is a block diagram of a document with prior-art structure.

FIG. 11 is the document of FIG. 10 with the intermediate structure of the present inventon.

FIG. 12 is a flow chart of a main translation loop for translating documents having the structure of the document of FIG. 10 into the intermediate structure of the present invention.

FIG. 13 is a detailed flow chart of the character-processing step in the flow chart of FIG. 12.

FIG. 14 is a detailed flow chart of the attribute processing step in the flow chart of FIG. 13.

DESCRIPTION OF A PREFERRED EMBODIMENT

The following description of a preferred embodiment first describes implementations of the invention in a single stand-alone document processing system and in a network of document processing systems. Thereupon, it describes a preferred embodiment of the intermediate document structure, and finally, it provides an example of translation between the preferred embodiment of the intermediate document structure and a prior-art document structure.

1. Stand-alone Translation System of the Present Invention: FIGS. 3 and 4

A block diagram of a stand-alone system for document translation according to the present invention is presented in FIG. 3. The document translation system shown in that figure is implemented in a standard multi-user document processing system such as the Wang Laboratories, Inc. "ALLIANCE" (TM) system. Such a document processing system commonly includes at least a mass storage device such as a disk drive for storing documents and document processing programs, a processor for processing documents, and local storage used by the processor to store data and programs while processing a document. In FIG. 3, these components are represented as document and program Storage 303, processor 301, and processor local memory 313. Under control of a program, processor 301 may fetch data and programs from document and program storage 303 to local memory 313, may execute the programs and process the data in local memory as specified by the programs, and may store processed data in storage 303. Other components of the system, not important for the present discussion and therefore not shown in FIG. 3, may include terminals for the users and means for reading and writing floppy disks.

Translation is necessary in a document processing system of the type shown in FIG. 3 when a user of the system wishes to process a document having a document structure different from that used in the document processing system. Such a situation may arise when the user has a copy of the document on a floppy disk made by a different document processing system. In this case, the document must be read from the floppy into storage 303 and then translated into the proper form before further processing is possible. Translation using an intermediate structure takes place in two steps: from the first document structure to the intermediate structure and from the intermediate structure to the second document structure. FIG. 3 shows the document processing system while executing the first step. Storage 303 contains document with structure A 305, document with intermediate structure I 307, and two programs: A-I extraction program 309 and I-B composition program 311. Program 309 is termed an extraction program because it extracts information from a document having structure A and produces a document containing the same information and having intermediate structure I. Program 311 is termed a composition program because it composes a document having structure B from the information contained in the document having structure I.

During the first step, processor local memory 313 contains four buffers, i.e., areas of memory in which data and programs relevant to the translation operation are stored during the translation operation. A buffer 315 contains the portion of document 305 which is currently being translated into the intermediate structure; I buffer 317 contains the result of the translation of the contents of A buffer 315 into the intermediate structure; state buffer 319 contains data which indicates the current state of the translation operation; code buffer 321, finally, contains the code from program 309 which processor 301 is currently executing.

During translation from structure A to structure I, the system operates as follows: for each portion of document A 305 being translated, processor 301 moves the components of document A's structure containing the portion from storage 303 into A buffer 315. Processor 301 then begins translating the contents of A buffer 315 under control of code from program 309. If code other than what is presently in code buffer 321 is required to perform the translation, that code is copied from program 309 into code buffer 321. As processor 301 translates, it places the result in I buffer 317. When I buffer 317 is full, it is copied to document I 307; similarly, when a portion of document 305 which is not presently contained in A buffer 315 is required, the required portion of document A 305 is copied from storage 303 to A buffer 315.

Variations on the above implementation of the invention will be immediately apparent to one skilled in the art. For example, document processing systems of the kind typified by the "ALLIANCE" generally have relatively small memories 313; consequently, the buffers 315, 317, and 321 will not be large and transfers between storage 303 and these buffers will frequently occur. When implemented in a system such as a general-purpose data processing system with large local memory, the buffers may be large enough to accept an entire document and all of code 309; and transfers between storage 303 and local memory 313 may occur only at the beginning and end of the translation operation. Large systems may also include means for permitting direct transfer of data between storage 303 and memory 313; in such systems, data would be transferred between document 305 and document 307 and buffers 315 and 317 and code from program 309 to buffer 321 without the direct intervention of processor 301. Further. in a multiprogramming system, state buffer 319 may contain state permitting interruption and resumption of a processing operation.

The second step is analogous to the first. FIG. 4 shows the document processing system during this step. The documents involved are the document with structure I 307 which resulted from the first step and a document with structure B which is to be the result of the second step. The program involved is I-B composition program 311. The buffers are I buffer 317, state buffer 319, code buffer 321, and B buffer 403, which contains data destined for document 401. Code buffer 321 contains code from I-B composition program 311. During the translation operation, processor 301 under control of I-B composition program 311 reads a portion of document 307 into I buffer 317, translates the contents of I buffer 317 into structure B, and places the result in B buffer 403. When B buffer 403 is full, its contents are written to document 401. Portions of program 311 are copied to code buffer 321 as required to perform the translation operation.

If the document processing system must deal with documents having structures other than structure A, then there must be a program analogous to A-I extraction program 309 for every structure which the document processing system must deal with. Of course, the number of such programs is reduced if all document processing systems adopt the convention that documents on floppy disks are in the intermediate structure. In that case, only two programs are required: I-B composition program 311 and a B-I extraction program for translating documents having the B structure into ones having the I structure.

2. Document Translation according to the Present Invention in a Network: FIG. 5

The situation in a networked system in which all documents which are transferred via the network have the intermediate structure is similar to the one which arises when all documents on floppy disks have the intermediate structure. As shown in FIG. 5, each of the systems in the network must have a composition program for translating documents from the intermediate structure into the structure used in the system and an extraction program for translating documents from the structure used in the system to the intermediate structure.

Network 505 of FIG. 5 connects two systems, system 501 using structure A and system 503 using structure B. Each system has storage 303. processor 301, and memory 313. System 501 further has A-I extraction program 309 and I-A composition program 507, while system 503 has I-B composition program 311 and B-I extraction program 509. FIG. 5 shows systems 501 and 503 as they would be set up in the course of a transfer of a document from system 501 to system 503. System 501 first operates under control of A-I extraction program 309 to translate document with structure A 305 into document with structure I 307 in the manner previously described. When the translation is finished, document with structure I 307 is sent via network 505 from system 501's storage 303 to the equivalent storage in system 503. System 503 then operates under control of I-B composition program 311 to translate document 307 into document with structure B 401. In a transfer of a document from system 503 to system 501, the reverse of the above occurs. System 503, operating under control of B-I extraction program 509, translates a document having structure B into its equivalent having structure I. That document is then sent via network 505 to system 501 which, operating under control of I-A composition program 507, translates the document with structure I into one with structure A.

Since all of the documents transferred via network 505 have the intermediate structure I, a given system attached to the network need only have an extraction program for translating the system's document structure into the intermediate structure and a composition program for translating the intermediate structure nto the system's document structure. Thus, regardless of the number of kinds of document structures used by systems attached to the network, a given system need only have two translation programs.

In the preceding discussion, it has been presumed that each step in the translation process translated an entire document. However, in embodiments of the invention in which the intermediate document structure is sequential, it is possible to translate from the first structure to the intermediate structure to the second structure in a continuous process in which the document having the intermediate structure is translated into one having the second structure as fast as the document having the intermediate structure is produced. In the stand-alone system of FIGS. 3 and 4, the two steps in the translation can be carried out by separate processes, one executing the extraction program and the other the composition program. In such a system there is no need for a separate document with the intermediate structure; instead, as A-I extraction program 309 executed by the first process outputs to I buffer 317, I-B composition program 311 executed by the second process reads from buffer 317 and outputs to buffer 403. When that buffer is full, program 311 outputs to document with structure B 401.

In the networked system of FIG. 5, A-I extraction program 309 executing in system 501 may output from buffer 317 directly to network 505, and I-B composition program 311 executing in system 501 may place data received over network 505 directly into buffer 317. Again, there is no need for a document with the intermediate structure in storage 303 of either system 501 or system 503. Which of the possible implementations is employed in a given system depends on the characteristics of the system. For example, in a system in which speed of transfer across network 505 is not a limiting factor, or one in which the size of storage 303 is, the document with the intermediate structure may be output directly to network 505. If, on the other hand, the speed of transfer is a limiting factor or the size of storage 303 is not, the document with the intermediate structure may be output to storage 303 and from there to the network.

3. The Intermediate Document Structure in a Preferred Embodiment:

FIG. 6

As previously indicated, the intermediate document structure in a preferred embodiment is sequential, i.e., the logical relationships between the components of the document are represented by the locations relative to each other of the components in the document structure. The intermediate document structure of a preferred embodiment is further distinguished by the fact that components of the document which are dependent from other components are nested within the components from which they are dependent. Both of these characteristics may be seen in FIG. 6, which shows parts of the intermediate document structure for a simple document. FIG. 6 represents a single sequence of data. Thus, the points indicated by A—A in the first and second lines of the figure are the same. Wavy lines indicate that the document structure includes material between the wavy lines which has been omitted.

The major component of the embodiment of the intermediate structure shown in FIG. 6 is the segment. The intermediate structure for a document contains at a minimum a single segment. Components of the document may be represented by other segments, which are then nested in the segment representing the entire document. A segment may contain components other than segments. These components include the data codes, generally character codes, which represent the document contents, attributes, which specify modifications to the appearance of the text represented by a sequence of character codes, control specifiers, which indicate modifications which apply to a single point in the text represented by a sequence of character codes, and descriptors, which immediately follow the beginning of a segment, attribute, or control specifier and contain information concerning the segment, attribute, or control specifier to which they belong.

In a preferred embodiment, the beginning of each segment is represented by a segment start code and a segment type code indicating the type of the segment, and the end of each segment is represented by a segment end code and the segment type code for the segment. In FIG. 6, the segment which contains all of the other components of the document has the 'stream' type. The start of the segment is marked by start of segment (SOS) 605, which contains start segment code (SSC) 601 and segment type code (STC) 603 indicating the 'stream' type. The end of the stream segment is marked by the end of segment (EOS) 641 in FIG. 6. EOS 641 for the stream segment contains end segment code ESC) 637 and a repetition of STC 603 indicating the stream type.

The stream segment contains a descriptor and a segment of the 'text' type. The descriptor contains administrative information about the document. Examples of such information include the name of the person who created the document, the name of the person who typed the document, the document's title, a description of its contents, and the document's classification, for example letter or memo. The descriptor begins with start of descriptor (SOD) 611 and ends with end of descriptor (EOD) 617. SOD 611 contains start descriptor code (SDC) 607 and descriptor type code (DTC) 609 identifying the descriptor type, and EOD 617 contains end descriptor code (EDC) 615 and a repetition of DTC 609. The area between SOD 611 and EOD 617 contains descriptor contents (DC) 613. In a preferred embodiment, all descriptors belonging to a segment must immediately follow that segment's SOS 605. Descriptors may not overlap and DC 613 may not contain a segment or another descriptor.

Segments of 'text' type contain the sequence of character or numeric codes which makes up the document and may also contain control specifiers, attributes, descriptors and other segments. SOS 605 for the text segment of FIG. 6 contains SSC 601 and STC 619 specifying the 'text' type, and EOS 639 for the text segment contains ESC 637 and STC 619 for the 'text type. The sequence of character or numeric codes in the text segment is represented by text codes (TC) 621.

The text segment of FIG. 6 also contains an attribute and a control specifier. The attribute is a revision attribute which indicates that a sequence of characters has been revised. The attribute begins with start of attribute (SOA) 627 and ends with end of attribute (EOA) 635. In a preferred embodiment, SOA 627 contains start attribute code (SAC) 623 and an attribute type code (ATC), which indicates the type of the attribute. Here, ATC 625 indicates the 'revision' attribute. EOA 635 contains end attribute code (EAC) 633 and ATC 625. The attribute applies to all of the characters represented by the character codes occurring between SOA 627 and EOA 635. The actual effect of the attribute depends on the document structure of the document which is finally produced from the intermediate document structure. For example, in some documents, a bar may appear in the margin next to the text represented by the character codes to which the attribute applies. In others, the attribute may have no meaning and will be ignored in the translation process. As will be explained in more detail later, attributes may overlap or be nested within a segment, but may not extend across segment boundaries. All descriptors applying to an attribute immediately follow SOA 627 for the attribute.

Control specifier (CTL) 630 in the text segment of FIG. 6 specifies a page break at the point in the sequence of character codes at which CTL 630 occurs. CTL 630 consists of two parts: control code (CC) 629 indicating a control specifier, and control type code (CTC) 631 indicating the kind of control specifier. CTC 631 in FIG. 6 is for a page break. Other CTC codes may specify line breaks, tabs, indentations, and similar text formatting functions. A CTL 630 may be immediately followed by one or more descriptors further describing the formatting operation specified by CTL 630.

In a present embodiment, SSC 601, ESC 637, SDC 607, EDC 615, SAC 623, EAC 633, and CC 629 are distinct arbitrary 8-bit codes; the type codes indicated by STC 603, DTC 609, ATC 625, and CTC 631 are distinct arbitrary 16-bit codes. In other embodiments. the codes may have different lengths. The character codes may belong to a set of character codes such as the ASCII, EBCDIC, or Wang Laboratories, Inc.'s WIS-CII character code set or code sets such as those for Prestel terminals. The numeric codes may include codes used to represent fixed decimal values or floating point values. Other types of segment may have other kinds of codes representing the information they contain.

In a present embodiment of the text segment, confusion between the codes used to define segments, descriptors, attributes, and control specifiers and the codes used to represent data is avoided by means of a unique eight-bit identity code which specifies that the preceding eight bits are not to be interpreted as one of the codes which marks the beginning or end of a segment, attribute, descriptor, or control specifier, but instead as a data code. This technique is illustrated in FIG. 7, where TC 621 in the third portion of the segment shown in the figure contains a character code identical with SSC 601. That character code is followed by identity code (IDC) 707, which prevents the code from being interpreted as the start of a segment. Variations of the technique just described may be employed in other embodiments. For example, the order of the code identifying the component and the code identifying the component type may be reversed and the identity code may indicate that a following code is not to be interpreted as a type code.

An advantage of the intermediate document structure of the present invention is its adaptability. In a present embodiment, a document has five kinds of components: segments, descriptors, attributes, control specifiers, and data codes. However, segments, descriptors, attributes, and control specifiers are identified by means of 8-bit codes, and consequently, new kinds of components may be added without changing the basic nature of the document structure. The same is true with regard to new types of segments, attributes, descriptors, and control specifiers. The types of these components are specified by 16-bit codes, and thus, it is possible to have up to 2**16 different types of segment and the same number of types for the attributes, the descriptors, and the control specifiers. Such adaptability of the intermediate structure is required to deal with the progress of document processing technology. For example, originally, documents were composed only of text; however, as the technology of document processing has expanded, documents have come to include images and voice data, and the present invention includes segment types for voice data and images and for the the binary data representing a voice signal or an image. As other items are included in documents, corresponding segment types may be added to the intermediate structure.

4. Segment Types in a Present Embodiment: FIGS. 7 and 8

In a present embodiment, there are 11 segment types:
1. stream: the stream segment type represents an entire document and contains the segments representing the components of the document.
2. text: the text segment type represents the body of the text of the document.
3. header: the header segment type represents the page headers used in a document.
4. footer: the footer segment type represents the page footers used in a document.
5. note: the note segment type represents text which is a note to the makers of the document. Notes are printed only on request.
6. footnote: the footnote segment type represents the text of a footnote which refers to a point in the text corresponding to the location of the footnote segment.
7. shelf: the shelf segment type represents data which has been stored for later use in the document.
8. external reference: the external reference segment type represents information which is required for the document but not contained in the document. The contents of the external reference segment specify how the information referred to is to be located.
9. binary: the binary segment type contains information represented by binary data codes instead of character codes. In a present embodiment, the binary segment type contains the data used to represent images and voice signals.
10. image: the image segment type contains information required to interpret the binary data in a binary segment representing an image.
11. voice: the voice segment type contains information required to interpret the binary data in a binary segment representing voice data.

Of these types, the text, header, footer, note, footnote, and shelf segments in a present embodiment all represent text sequences, and consequently may contain TCs 621, attributes, and control specifiers. FIG. 7, showing a detailed representation of a text segment is exemplary for all of these segment types. The text segment of FIG. 7 represents text which begins with a title which is centered and underlined and which has been revised. The segment begins with SSC 601 and STC 619 specifying a text segment, contains CC 629 and CTC 702 specifying that the following text is to be centered, SAC 623 and ATC 625 specifying the beginning of a revised section of text, SAC 623 and ATC 703 specifying the beginning of a section of text which is underlined, attribute descriptor 711, specifying that the underline is to be a single underline and including SDC 607, DTC 709 indicating single underline, EDC 615, and DTC 709, TC 621 representing the sequence of characters in the title, EAC 633 and ATC 703 marking the end of the portion to be underlined, two occurrences of CC 629 and CTC 705 'return' marking the end of the title and a blank line following the title, TC 621 containing the text following the title, EAC 633 and ATC 625 marking the end of the portion of the text which was revised, additional TC 621, and ESC 637 and STC 619 specifying the end of the segment. As previously explained, IDC 707 and SSC 601 in the third line of the figure show how the identity code is used to distinguish data codes from those which indicate the start or end of a component of the document. FIG. 7 also shows how, as previously explained, attributes may overlap.

In a present embodiment, the text, header, footer, note, footnote, and shelf segment types all have the general form just presented; however, the header and footer segment types in a present embodiment may not contain other segments. There is no such restriction for the text, note, footnote, and shelf types. For example, a text segment may include a note or footnote segment, and if the text includes a picture, an image segment and a binary segment representing the image.

A segment of the external reference type has as its contents the information required to locate the external reference. For example, if the external reference is to another document, the external reference segment will contain the information which the document processing system requires to locate the other document In a present embodiment, a binary segment is always preceded by a segment specifying how the data contained in the binary segment is to be interpreted. Presently, such interpretive segments are either voice segments or image segments. Other embodiments may of course include other kinds of interpretive segments. FIG. 8 presents a detailed representation of one such combination of an interpretive segment with a binary segment. In that figure, the interpretive segment is a voice segment. The voice segment begins with SSC 601 and STC 801 for the voice type and ends with ESC 637 and STC 801 for the voice type. Its contents are the information required to properly interpret the contents of the binary segment. In a present embodiment, the contents of the voice segment include audio data type (ADT) 803, which specifies the type of audio data contained in the binary segment, V 805, specifying the version of that type, the digitization rate (DR) 807 for the audio data, and the length of time (T) 813 represented by the following binary data.

The binary segment begins with SSC 601 and STC 811 for the binary type and ends with ESC 637 and STC 811 for the binary type. The contents of the segment include L 813, specifying the length of the data in bytes, and BC 815, containing the binary data codes. The contents of L 813 and BC 815 are interpreted solely as binary data, and consequently, a binary segment in a present embodiment cannot contain other segments, attributes, or control specifiers.

The relationship between the image segment and the binary segment containing the image data is substantially the same as that between the voice segment and the binary segment containing the voice data. In a present embodiment, the information used to interpret the image data includes image type, horizontal and vertical size, horizontal and vertical resolution, the encoding scheme, the version of the encoding scheme, the encoding parameter, a code indicating the hardware which was the source of the image, the display format, and the display color. In other embodiments, the binary segment may contain codes representing video images and the image data may include the information needed to produce a video image from those codes.

5. Attribute Types in a Present Embodiment

A present embodiment of the invention has 11 attribute types:
1. underscore: the underscore attribute indicates that the sequence of characters specified in the attribute is to be underscored.
2. script: the script attribute indicates that the specified sequence of characters is a subscript or superscript.
3. bold: the bold attribute indicates that the specified sequence is to be in bold-face type.
4. optional: the optional attribute indicates that the specified sequence of characters is to be displayed or not as the user specifies.
5. no break: the no break attribute indicates that the specified sequence of characters will not be broken when lines are formatted.
6. strike through: the strike through attribute indicates that the characters in the specified sequence will be overstruck by a specified character.
7. table of contents: the table of contents attribute indicates that the characters in the specified sequence are to be included in the table of contents.
8. index: the index attribute indicates that the characters in the specified sequence are to be included in the document's index.
9. revision: the revision attribute indicates that the text represented by the specified sequence has been revised.
10. reverse video: the reverse video attribute indicates that the characters in the specified sequence are to be displayed in a manner which is the reverse of that usually used.
11. italics: the italics attribute indicates that the characters in the specified sequence are to be in italics.

Several of the above attributes may have several variants. For example, in a present embodiment, underscore may specify one or two-line underscore and script may specify a superscript or a subscript. As pointed out in the discussion of the text segment and shown in FIG. 7, a given variant is specified by means of an attribute descriptor 711 in the attribute.

6. Control Specifier Types in a Present Embodiment

In a present embodiment, there are thirteen types of control specifiers. They are the following:
1. alignment: the text at the point of the control specifier is to be aligned on a character such as a decimal point, comma, or asterisk.
2. tab alignment: the text at the point of the tab alignment control specifier is to be aligned with the next tab stop.
3. indent alignment: the left margin at the point of the indent alignment specifier is temporarily reset a previously-specified amount.
4. center: the line following the control specifier is centered.
5. hard return: the hard return control specifier specifies a point at which the current line must end until the author of the document specifies otherwise.
6. soft return: the soft return control specifier specifies the point at which the current line ends as the document is currently formatted.
7. hard page: the hard page control specifier specifies the point at which the current page must end until the author of the document specifies otherwise.
8. soft page: the soft page control specifier specifies the point at which the current page ends as the document is currently formatted.
9. column: the column control specifier specifies the point at which a column begins. Descriptors following the column control specifier specify the line spacing, line justification, lines per inch, and pitch in the column.
10. set format: the set format control specifier specifies the point at which a new format for the text begins. Descriptors following the set format specifier specify the new format. The descriptors may specify line spacing, settings for alignment, tabs, and indentation, and settings for centering, right justification, line justification, lines per inch, and pitch.
11. set character set: the set character set control specifier specifies the point in the text at which a new interpretation of the document's character codes begins. The interpretation is specified by a descriptor following the set character set control specifier.
12. merge: the merge control specifier indicates a point at which text characters from another document will be inserted into this document.
13. no merge: the no merge control specifier indicates a point at which no merging will be permitted.

As is apparent from the above descriptions, where a control specifier has a number of possible effects on the format of the document, the exact effects are specified by means of descriptors immediately following the control specifier.

7. Using Descriptors to Name Document Components: FIG. 7

In some prior-art document structures, document components may have character-string names. The names may be used in various document processing operations to refer to the components. In a present embodiment of the intermediate document structure, a component's name is represented by a descriptor of the 'name' type. FIG. 9 shows how a descriptor of the name type may be used to represent the name of a text shelf segment. The descriptor follows immediately after STC 901 for the shelf and consists of SDC 607, DTC 903 for the 'name' type, a character sequence 905 representing the name, EDC 615, and DTC 'name' 903.

8. A Document with a Prior-art Structure and its Equivalent with the Intermediate Structure: FIGS. 10–11

The discussion next turns to a specific example of translation between a given document structure and the intermediate structure. There are first presented a document having a document structure of the type presently used in word processing and an equivalent document having the intermediate structure of the present invention. Thereupon, the methods by which the translations are accomplished are discussed.

FIG. 10 is an illustration of the document structure of the type presently used. The structure is made up of equal-sized numbered blocks in a file. The blocks have three different kinds of contents: administrative information about the document, indexes by means of which components of the document may be located, and the actual text of the documents. The administrative blocks are at fixed locations in the file. Blocks of other types may be anywhere in the file. Thus, except for the administrative blocks, there is no relationship between the location of a block in the file and its function in the document. Blocks are located in the file by means of pointers specifying block numbers. The pointers may be used to link blocks into chains and to form indexes by which the blocks may be located.

The document illustrated in FIG. 10 contains two pages of text and a named text shelf. Each page has a header and footer, and a portion of the text on one of the pages is underscored. The pages of text are contained in document body chain 1025. Document body chain 1025 consists of text blocks 1002. Each text block 1002 in the chain is linked by means of a pointer to the preceding and following block in the chain. The double linking makes it possible to move easily from one part of the document body to another.

The text blocks in the chain have two major components: the text portion (T) and the attribute portion (A). T contains character codes for the text of the document, codes representing tabs indentations, page breaks, and the like, and special codes called attribute characters. The last character in T of each text block is a special etx character code indicating the end of T. In FIG. 10, attribute characters appear as AC 1033 and the etx character as etx 1031.

The A portion of a text block 1002 contains informational attributes and visual attributes. Each informational attribute corresponds to an attribute character and contains references by means of which other text blocks 1002 containing the information required for the informational attribute may be located. The information applies at the location in the text specified by the attribute character corresponding to the informational attribute. In FIG. 10, there are three format attributes (FA) 1035, each one specifying a format for text and corresponding to an AC 1033 in T of text block 1002 containing FA 1035. The visual attributes specify ranges of characters in the text to which a modification such as underlining or bold face type applies. In FIG. 10, there is one visual attribute, VA 1023, specifying which portion of the text is underlined.

Document body chain 1025 contains two pages of text. In the document structure of FIG. 10, each page must have a FA 1035. The FA 1035 specifies the page's format, any headers or footers for the page, and the fact that the AC 1033 corresponding to the FA 1035 also specifies the location of the beginning of a new page. The format, header, and footer are specified by means of references in FA 1035 to text block chains containing the information required for the format, header, and footer. Thus, FA 1035 in the first block (21) in page 1 1027 has three references, represented by FOR, HR, and FR. FOR refers to the text block (35) containing the page format, HR refers to the text block (12) containing the header, and FR refers to the text block (26) containing the footer. The first text block in page 2 1029 has the same informational attribute as the first text block in page 1 1027. In addition, text block (15) of that page contains VA 1023, the visual attribute indicating the part of the text which is underscored.

The chains of text blocks containing the header, footer, and format referred to in FA 1035 are each made up of only 1 block in the present example document. Text block (26) contains footer 1017, text block (12) contains header 1019, and text block 35 contains format 1021. Header 1019 and footer 1017 both have FAs 1035 containing the reference FOR referring to format 1021. Headers', footers', and text thus all share the same format. The final component of the document of FIG. 10, text shelf 1015, is made up of another chain of text blocks containing 2 blocks. (20) and (30).

The remaining parts of the document structure of FIG. 10 are four administrative blocks 1031 containing document info blocks 1001, document table (DT) 1003, and three index blocks 1033 including name index block (NIB) 1005, page index block (PIB) 1007, and reference index block (RIB) 1009. Document info blocks 1001 include administrative information about the document such as the document s title, creator, subject, size, and so forth. DT 1003 contains pointers to the document's indexes. P10 points to NIB 1005, P16 points to PIB 1007, and P40 points to RIB 1009. DT 1003 is always at a fixed location in the document structure, and consequently, any component of the document can be located by using DT to find the proper index and then using the index to locate the component.

The three index blocks correspond to three indexes: a name index by which a named component of the document may be located using the component's name, a page index by which individual pages of the document may be located, and a reference index by which chains containing information referred to by references in informational attributes may be located. In the document of FIG. 10, each of these indexes is contained in one index block: the name index in NIB 1005, the page index in PIB 1007, and the reference index in RIB 1009. In larger documents, an index may contain more than one index block.

The name index is made up of name index entries (NIEs) 1006. Each name index entry contains a name and a pointer to the first text block of the chain containing the named component. Thus, NIE 1006 in NIB 1005 contains P20 pointing to text block (20), the first text block in text shelf 1015. The page index in PIB 1007 is made up of page index entries (PIEs) 1008. Each PIE contains a page number and a pointer to the first text block for the page. The document of FIG. 10 has two pages, the first beginning on block (21) and the second beginning on block (9), and accordingly, the PIE for page 1 contains P21 and that for page 2 contains P9. The reference index in RIB 1009 is made up of reference index entries (RIEs) 1010. Each RIE contains a reference number (represented here by FOR, HR, and FR), and a pointer to the first block of the chain containing the reference, here block (35) for FOR, block (12) for HR, and block (26) for FR.

The components of the document structure and those of the intermediate document structure correspond as follows:

| Structure of FIG. 10 | Intermediate Structure |
| --- | --- |
| entire document | stream segment |
| document body chain 1025 | text segment |
| text shelf 1015 | text shelf segment |
| footer 1017 | footer segment |
| header 1019 | header segment |
| format 1021 | set format control specifier |
| tabs, page breaks, etc. | control specifiers |
| VA 1023 | attribute |
| Doc info blocks 1001 | descriptors |

The intermediate structure has no components corresponding to DT 1003 or the index blocks, since the relationship of the components to each other in the intermediate structure is determined by their positions relative to each other in the intermediate structure.

FIG. 11 shows the translation of the document of FIG. 10 into an equivalent document with the intermediate structure. That document begins with SOS for the 'stream' type 1101 and ends with EOS for the stream type 1151. Immediately following SOS 1101 are descriptors 1103 containing the information from document information blocks 1001 of the FIG. 10 document. Then comes SOS for the 'text' segment for the contents of document body chain 1025, followed by PB CTL 1107, a page break control specifier marking the beginning of page 1, a set format control specifier 1109 and text format descriptors 1111 containing information as to how the text is to be formatted. The format described in text format descriptors 1111 remains in effect until another SF CTL 1109 occurs in the text segment. The information in descriptors 1111 is obtained from format 1021 of the FIG. 10 document. Following descriptors 1111 is a header segment for the page 1 header. The segment includes SOS 'header' 1113, SF CTL 1109 for the header format, header format descriptors 1115, header text 1117, and EOS 'header' 1119. Header text 1117 is obtained from header 1019, and header format descriptor from format 1021, as specified by FA 1035 in header 1019.

Next in the intermediate structure comes a footer segment for the page, containing SOS 'footer' 1121, SF CTL 1109, footer format descriptor 1123, footer text 1125, and EOS 'footer' 1127. Like a format, once a header or footer is established, it remains effective until a new one is established. Following the footer segment is page 1 text 1129. At the end of the text comes PB CTL 1107 for the page break at the end of the first page. Since page 2 has the same format, header, and footer as page 1, there is no need for format, header, or footer segments. Next is page 2 text 1131, from page 2 1029. Page 2 1029 contains a visual attribute indicating an underscore, and consequently, included in page 2 text 1131 is an underscore attribute, which contains SOA 'underscore' 1133, an attribute descriptor 1135 indicating whether the underscore is single or double, the underscored portion of text 1131, and EOA 'underscore' 1139. Thereupon come ununderscored text 1131 and EOS 'text' 1141, marking the end of the text segment. The rest of the stream segment is occupied by the text shelf segment corresponding to text shelf 1015. That segment includes SOS 'shelf' 1143, a descriptor 1145 containing the shelf name (obtained from NIB 1005), the shelf content 1147, from the text blocks in text shelf 1015, and EOS 'shelf' 1149'. Following the text shelf segment and terminating the intermediate document structure is EOS 'stream' 1151.

9. Translation Methods

As may be seen by a comparison of FIGS. 10 and 11, relationships which are expressed by means of attributes, indexes, and pointers in the document structure of FIG. 10 are expressed by means of nested segments, attributes, and descriptors in the document structure of FIG. 11. Thus, in the document structure of FIG. 10, the fact that each page has an identical header is expressed by the fact that the reference HR appears in FA 1035 for each page, while the same fact is expressed in the document structure of FIG. 11 by placing a header segment in the text segment ahead of the text for the first page to which it applies.

In programming terms, what happens is that when AC 1033 is encountered in T of block (21), the processing of document body chain 1025 must be interrupted, FA 1035 must be examined, and if it specifies a page break, new header, new footer or new format, a PB CTL 1107, a header segment, a footer segment, or a SF CTL 1109 and its associated descriptors 1111 must be placed in the intermediate structure. After that has been done, the processing of document body chain 1025 must be resumed. If, as is the case here, the header or footer referred to in FA 1035 itself has in its text an AC 1033 and that AC 1033 refers to another FA 1035 containing a reference (here the reference to format 1021, FOR), then the processing of the header or footer must be interrupted to process the chain of blocks referred to by that reference. The nested components of the intermediate document structure thus correspond to a processing sequence in which the processing of a given component of the document of FIG. 10 is begun, is interrupted when information from another component is required, and is resumed when the processing of the other component is complete.

In a present embodiment, the required processing sequence is achieved by means of a stack which is part of State Buf 319: when the processing of a first component is interrupted, state including the kind of component and the current location in the component is saved on the stack. Then the new component is located and processed. When the processing of the new component is complete, the saved state is restored from the stack and processing of the first component continues. Generally speaking, in the document structure of FIG. 10, an interruption or resumption of processing of a component involves a shift from one chain of text blocks to another.

FIG. 12 shows the main translation loop of a preferred embodiment of a translation program for translating the document structure of FIG. 10 into the intermediate document structure. During operation of the loop in a system such as that shown in FIG. 3, the portions of the document which are currently being translated are read from storage 303 into A buf 315; as the intermediate document is produced, it is written to I buf 317, and from there to storage 303. The portions of the program currently being executed are contained in code buf 321, and state buf 319 contains the stack, a position block indicating the location of the character currently being processed, a value indicating the kind of component being processed, the character currently being processed, and other values necessary for the operation of the program.

The loop begins with initialization block 1201. Procedures in that portion of the program output SOS 'stream' 1101 and then read the contents of doc info blocks 1001 and place descriptors 1103 containing the information from those blocks immediately after SOS 101. Initialization continues by using DT 1003 to locate the first text block in document body chain 1025. Once the block is found, the program outputs SOS 'text' 1105 and begins to process the characters in T one at a time. Processing is done in the main translation loop.

On entering the main translation loop, two boolean variables, result and not$exhausted, are set to True (block 1203). As may be seen from decision block 1205, the main translation loop will continue to operate until either result or not$exhausted is false. result is set to False if any processing step in the main translation loop fails, and not exhausted is set to False when the entire document has been translated. The main translation loop thus terminates either as a result of a failure in translation or upon completion of translation.

Translation then commences with the first character in T of the first text block in page 1 1027 and continues one character at a time (block 1209). As shown by block 1211, if the character being processed is any character other than etx 1031, it is processed by process char 1213. As will be explained in more detail later, if the character is a text character, processing of the current chain continues; if it is an AC 1033, state is saved and the next character processed by the main loop is the first byte from the corresponding informational attribute. If one of the bytes in the informational attribute is a reference to another text chain, the program saves state, outputs a code indicating the type of the chain it is processing, outputs the characters necessary to indicate the start of the new component being processed, and processing continues with bytes from the text chain referred to in the reference.

If the character is etx 1031, the end of T in a text block in the chain currently being processed has been reached. The manner in which processing continues is determined by whether the text block is the last in a page, the last in a chain. or the last in a document. If the text block is not the last in a chain, it will contain a pointer to its successor; if the text block is the last on a page, the first character in the successor block will be an AC 1033 corresponding to a FA 1035 specifying a page break. When the text block is neither the last in a chain or the last on the page, processing continues with the first character of T in the successor block. (decision block 1215). When the text block is the last on a page, that character will be AC 1033 corresponding to FA 1035 specifying the page break, and a PB CTL 1107 will be output in the course of processing the AC 1033.

The program determines whether the text block is the last in the document by examining the stack. If it is empty, there are no other chains to be processed and no more characters in the present chain. When the text block is the last in the chain, but not the last in the document (decision block 1217), processing of the component represented by the chain has been completed, and the program writes the codes necessary to end the component to the intermediate document (block 1218) and then restores the state saved when processing of the current chain began (block 1219). That state contains the location of the next character to be processed, and processing continues as described. If the text block is the last in the document, not$exhausted is set to F (block 1221), which terminates the main translation loop. On termination, the codes necessary to end the stream segment containing the document are output to the intermediate document.

Continuing with FIG. 13, which presents a detail of process char block 1213, the program first determines whether the character being processed is part of a sequence of text (decision block 1300). If it is, it determines whether the character is an AC 1033 (block 1301). If it is, the program saves the current state (block 1303) and resets the position block to indicate the beginning of the informational attribute associated with AC 1033 (block 1305). Thus, the next character fetched in the main loop is the first byte of the associated attribute. If the character is not an AC 1033, the program next determines whether it is a control character, i.e., whether it is a tab, indent, carriage return, or the like (block 1309). If it is, the program writes a control specifier corresponding to the control character to the document with the intermediate structure (block 1315). If it is not, the program examines the visual attributes associated with the character to determine whether they have changed (block 1311). If they have, it does the processing required to begin or end an attribute in the intermediate document and then outputs the character to the intermediate document (block 1313). Thereupon, the next character is fetched.

If the character is not part of the text, it is part of an informational attribute or some other non-textual entity such as a format. In that case, further processing depends on whether the character is a reference (block 1315). If it is, the current state is again saved and the position block is set to the start of the chain referred to by the reference (blocks 1323 and 1325). Thus, the next character processed by the main loop will be the first character of that chain. If the character is not a reference and the item currently being processed is not yet finished (decision block 1317), the character is processed as required for the item (block 1321). For example, if what is being processed is an informational attribute specifying a page break, the program will output a PB CTL 1107. If the item is finished, the program will restore the state saved when the processing of the item began (block 1319).

FIG. 14, finally, contains a detailed representation of the visual attribute processing performed in block 1311. In a present embodiment, the translation program receives attribute information about a character from the document of FIG. 10 in the form of a bit array indicating which attributes are on and which are off for that character. The translation program first compares the entire bit array associated with the current character with the entire bit array associated with the last character received from the block. If there is no change, the program goes directly to block 1313 (block 1401). If there has been a change, the program compares the two bit arrays bit by bit. If a bit in the array for the current character is the same as the corresponding bit in the array for the previous character, the program simply compares the next bits (block 1405); if they are not, the program determines from the comparison of the corresponding bits whether the visual attribute represented by the bits has been turned on or off (block 1409). In the former case, the program writes the codes necessary to start the attribute to the intermediate document (block 1411); in the latter, the program writes the codes necessary to end the attribute (block 1413).

A concrete example of how the program works is provided by the processing of page 1 1027. During initialization, the program examines DT 1003 to determine if there is a pointer to PIB 1007. If there is, there is text in the document, and the program outputs SOS 'text' 1105. Using PIE 1008 to page 1 of the document in PIB 1007, the program locates text block (21), the first block in page 1 1027, and begins processing the first character in the block. That character is AC 1033 corresponding to FA 1035, so the program saves state and begins processing FA 1035. FA 1035 specifies a page break, and consequently, PB CTL 1107 is output to the document with the intermediate structure. FA 1035 also specifies a new format, the one referred to by FOR. Consequently, process char 1213 again saves state, locates block (35) containing format 1021, sets the state to specify the first character in block (35) and that the chain being processed is a format chain, and outputs SF CTL 1109. The main translation loop then forms format descriptors as required by the text of block 35. When etx 1031 in block (35) is reached, the program responds as shown in FIG. 12 for an etx 1031 which is the last in a chain. In this case, a control specifier is being processed, and thus, no special end codes are required The program then restores the state saved when processing format 1021 began and resumes processing FA 1035. The next item is reference HR for header 1019, so the program again saves the current state, outputs SOS 'header 1113'. and begins processing T in header 1019. The first character in T of header 1019 is, however, AC 1033 referring to FA 1035 in A of header 1019. This FA 1035 contains only the reference FOR to format 1021. Process char 1213 therefore again saves the current state, outputs SF CTL 1109 following SOS 'header' 1113, saves state again, produces header format descriptors 1115 from the text in format 1021, and restores state as previously described. Since there are no further items in FA 1035, state is again restored and the remaining characters in header 1019 are processed, to produce header text 1117. When etx 1031 in header 1019 is reached, state is again restored and processing of FA 1035 continues.

The next item in FA 1035 is FR, referring to footer 1017, which is processed in the fashion described for header 1019. When processing of footer 1017 is finished, processing of AC 1033 in block (21) is finished and the remaining text characters in the block and the remaining blocks of page 1 are processed to produce page 1 text 1129. When AC 1033 of block (9), the first block in page 2, is reached, FA 1035 in that block is processed. Since FA 1035 of block (9) specifies the same format, header, and footer as FA 1035 of block (21), there is no need to output a new SF CTL, header segment, or footer segment, and all that is output is PB CTL 1107 marking the end of page 1. Processing continues as described above until all of the components of the document have been translated.

Translation from the intermediate structure to the document structure of FIG. 10 employs the same general methods as translation in the other direction. First, the document structure is initialized by setting up the administrative blocks and the first index blocks and loading doc info blocks 1001 with the information from doc info block descriptors 1103. Then the processing of the contained segments begins. Each segment corresponds to a different text chain in the document structure of FIG. 10, and consequently, each time the beginning of a segment is encountered, processing of the current chain must be interrupted and processing of a new chain commenced. Each time the end of a segment is encountered, processing of the chain corresponding to the segment containing the segment which ended must resume. Again, the program uses the technique of saving state on a stack each time processing is interrupted and restoring state each time processing of a segment terminates.

While a document translated from a given document structure into the intermediate document structure and then back to the original document structure will contain the same information as the original document, the final document structure may not be completely identical with the original document structure. For example, many of the text blocks of FIG. 10 contain attributes referring to a single header block 1019. In the intermediate document structure, a header segment is produced each time the header changes. The program which translates from the intermediate document structure to the structure of FIG. 10 may not check whether a given header segment is identical to a header segment which appeared previously in the document. If it does not perform such a check, the program will translate each header segment it encounters into a separate text block and the resulting document structure will contain more text blocks and RIEs 1010 than the original document structure.

10. Conclusion

The foregoing Description of a Preferred Embodiment has disclosed how an intermediate document structure may be used to translate a document having one structure into an equivalent document having another structure, has showed how stand-alone and network systems may be constructed which use the intermediate structure to translate documents, has disclosed a preferred embodiment of the intermediate document structure, and has shown in detail how a document may be translated from a prior-art document structure to the intermediate structure of the present invention and vice-versa.

The preferred embodiment disclosed herein is, however, only one possible embodiment of the invention. For example, the basic form of the intermediate document structure of the present invention may be maintained while employing different conventions regarding the codes which begin and end segments, attributes, descriptors, and control specifiers. Moreover, some embodiments may have a segment or other construct corresponding to each reference, rather than only to references which establish new formats, headers, or footers. Further, the document structure of the present invention is inherently expandable, and consequently new components and new types of the components disclosed herein may be added. Finally, translation using the intermediate structure may be accomplished by programs employing algorithms different from those disclosed herein but having the same result. Thus, the preferred embodiment disclosed herein is to be considered in all respects illustrative and not restrictive, the scope of the invention being indicated by the appended claims rather than the foregoing description, and all changes which come within the meaning and range of equivalency of the claims are intended to be embraced therein.

What is claimed is:

1. A document structure for representing a document being interchanged among document processing systems comprising:
   one or more nestable segments for representing components of the document, more than one level of nesting being permitted in a segment and the segments being so ordered that a segment representing a component dependent from a given component is always nested within the segment representing the given component,
   each segment having one of a plurality of types and containing
   (1) means for identifying the start and type of the segment at the beginning of the segment;
   (2) means for representing the contents of the segment; and
   (3) means for identifying the end and type of the segment at the end of the segment.

2. In the document structure of claim 1 and wherein:
   the means for identifying the type and start of the segment are a start segment code and a segment type identifier code in sequence; and
   the means for identifying the type and end of the segment are an end segment code and the segment type identifier code in sequence.

3. In the document structure of claim 2 and wherein:
   a start segment code occurring elsewhere in the document structure than at the start of a segment or an end segment code occurring elsewhere in the document structure than at the end of a segment is associated with an unambiguous identity code,
   whereby the start segment code or the end segment code is marked as not beginning or ending a segment.

4. In the document structure of claim 1 and wherein:
   the means for representing the contents of the segment contains at least one descriptor containing information about the segment.

5. In the document structure of claim 4 and wherein:
   all descriptors belonging to the segment immediately follow the means for identifying the type and start of the segment.

6. In the document structure of claim 5 and wherein:
   each descriptor sequentially includes
   (1) means for identifying the type and start of the descriptor;
   (2) means for representing the contents of the descriptor; and
   (3) means for identifying the type and end of the descriptor.

7. In the document structure of claim 6 and wherein:
   the means for identifying the type and start of the descriptor are a start descriptor code and a descriptor type identifier code in sequence;
   the means for identifying the type and end of the descriptor are an end descriptor code and the descriptor type identifier code in sequence; and
   the means for representing the contents of the descriptor is a sequence of character codes.

8. In the document structure of claim 7 and wherein:
   a start descriptor code occurring elsewhere in the document structure than at the start of a descriptor or an end descriptor code occurring elsewhere in the document structure than at the end of a descriptor is associated with an unambiguous identity code,
   whereby the start descriptor code or the end descriptor code is marked as not beginning or ending a descriptor.

9. In the document structure of claim 1 and wherein:
   the means for representing the contents of a segment includes means for representing the text of a document.

10. In the document structure of claim 9 and wherein:
    the means for representing the text of a document includes a string of information including text codes.

11. In the document structure of claim 10 and wherein the means
    for representing the text of a document further includes an attribute for supplying information concerning a portion of the string.

12. In the document structure of claim 11 and wherein:
    the attribute sequentially includes
    (1) means for identifying the type and start of the attribute;
    (2) the portion of the string; and
    (3) means for identifying the type and end of the attribute.

13. In the document structure of claim 12 and wherein:
    the means for identifying the type and start of the attribute are a start attribute code and an attribute type identifier code in sequence;
    the means for identifying the type and end of the attribute are an end attribute code and the attribute type identifier code in sequence; and
    the means for representing the contents of the attribute is a sequence of text codes.

14. In the document structure of claim 13 and wherein:
    a start attribute code occurring elsewhere in the document structure than at the start of an attribute or an end attribute code occurring elsewhere in the document structure than at the end of an attribute is associates with an unambiguous identity code,
    whereby the start attribute code or the end attribute code is marked as not beginning or ending an attribute.

15. In the document structure of claim 11 and wherein:
    the attribute further includes at least one descriptor containing information about the attribute.

16. In the document structure of claim 15 and wherein:
    all descriptors belonging to the attribute immediately follow the means for identifying the type and start of the attribute.

17. In the document structure of claim 16 and wherein:
    each descriptor sequentially includes
    (1) means for identifying the type and start of the descriptor;
    (2) means for representing the contents of the descriptor; and
    (3) means for identifying the type and end of the descriptor.

18. In the document structure of claim 17 and wherein:

the means for identifying the type and start of the descriptor are a start descriptor code and a descriptor type identifier code in sequence;

the means for identifying the type and end of the descriptor are an end descriptor code and the descriptor type identifier code in sequence; and the means for representing the contents of the descriptor is a sequence of character codes.

19. In the document structure of claim 18 and wherein:

a start descriptor code occurring elsewhere in the document structure than at the start of a descriptor or an end descriptor code occurring elsewhere in the document structure than at the end of a descriptor is associated with an unambiguous identity code, whereby the start descriptor code or the end descriptor code is marked as not beginning or ending a descriptor.

20. In the document structure of claim 10 and wherein:

the means for representing the text of a document includes control means specifying information concerning a point in the string.

21. In the document structure of claim 20 and wherein:

the control means includes means for specifying the point at which the control means applies and the type of control means.

22. In the document structure of claim 21 and wherein the control means includes (1) a control means code at the point at which the control means applies and (2) a control means type code following the control means code.

23. In the document structure of claim 22 and wherein:

a control code occurring elsewhere in the document structure than the position in the string at which it applies is preceded by an unambiguous identity code, whereby the control code is marked as not specifying a position in the string at which a control code applies 24. In the document structure of claim 21 and wherein:

the control means further includes at least one descriptor containing information about the segment.

25. In the document structure of claim 24 and wherein:

all descriptors belonging to the control means immediately follow the means for specifying the point at which the control means applies and the type of the control means.

26. In the document structure of claim 25 and wherein:

each descriptor sequentially includes (1) means for identifying the type and start of the descriptor;

(2) means for representing the contents of the descriptor; and (3) means for identifying the type and end of the descriptor.

27. In the document structure of claim 26 and wherein:

the means for identifying the type and start of the descriptor are a start descriptor code and a descriptor type identifier code in sequence;

the means for identifying the type and end of the descriptor are an end descriptor code and the descriptor type identifier code in sequence; and the means for representing the contents of the descriptor is a sequence of character codes.

28. In the document structure of claim 27 and wherein:

a start descriptor code occurring elsewhere in the document structure than at the start of a descriptor or an end descriptor code occurring elsewhere in the document structure than at the end of a descriptor is associated with an unambiguous identity code, whereby the start descriptor code or the end descriptor code is marked as not beginning or ending a descriptor.

29. In the document structure of claim 1 and wherein the plurality of types includes a stream type specifying that the segment having the type contains an entire document and any segment in the means for representing the contents of the segment has a type other than the stream type.

30. In the document structure of claim 1 and wherein:

the plurality of types includes a text type specifying that the segment having the type contains document text;

the document structure has at least one text segment having the text type; and the means for representing the contents of the segment includes text character codes.

31. In the document structure of claim 1 and wherein:

the plurality of types includes an external reference type specifying that the segment having the type contains a reference to information external to the document;

the document structure includes at least one external reference segment having the external reference type; and the means for representing the contents of the external reference segment includes means for identifying the external reference.

32. In the document structure of claim 1 and wherein:

the plurality of types includes a binary type specifying that the segment having the type contains codes representing binary values;

the document structure includes at least one binary segment having the binary type; and the means for representing the contents of the binary segment includes codes representing binary values.

33. In the document structure of claim 32 and wherein:

the codes representing binary values include a code specifying the number of codes representing binary values contained in the segment.

34. In the document structure of claim 32 and wherein:

the plurality of types includes a binary interpretation type specifying that the segment having the type contains codes indicating how the codes in an associated binary segment are to be interpreted;

the document structure includes at least one binary segment and a binary interpretation segment having a binary interpretation type associated with the binary segment; and the means for representing the contents of the segment includes codes indicating how the binary values in the associated binary segment are to be interpreted.

35. In the document structure of claim 34 and wherein:

the associated binary segment contains binary voice data;

the binary interpretation type is a voice type; and the binary interpretation segment is a voice segment specifying how the binary voice data is to be interpreted.

36. In the document structure of claim 35 and wherein:

the associated binary segment contains binary image data;

the binary interpretation type is an image type; and the binary interpretation segment is an image segment specifying how the binary image data is to be interpreted.

37. In the document structure of claim 1 and wherein: the plurality of types includes
   a header type;
   a footer type;
   a note type;
   a footnote type; and
   a shelf type.

38. In the document structure of claim 1 and wherein:

the segments further include a segment for representing an entire document and the segments representing the components are nested within the segment for representing the entire document.

39. In the document structure of claim 1 and wherein:

the segment representing the dependent component is nested within the segment representing the other component at the location in the segment representing the other component at a point corresponding to the point in the other component where information contained in the dependent component is required.

40. The document structure as set forth in claim 1 and wherein:

a segment may have any length required by the component it represents.

41. The docummment structure as set forth in claim 1 and wherein:

no segment in the document structure requires information contained in a following segment.

42. In a system for interchanging documents between document processing systems, a method of automatically translating a first document structure representing a document into an interchange document structure which represents the document and which consists of one or more nestable segments for representing components of the document comprising the steps of:

for any component of the first document structure, translating the component into a first segment of the interchange document structure;

if the component being translated has dependent component containing information required in the component being translated, translating the dependent component into a second segment of the sequential document structure which is nested at a point in the first segment corresponding to the point in the component being translated where the inforamtion is required.

43. In the method of claim 42 and wherein:

the first structure is one of a plurality of structures; and the steps of the method are performed using processing means programmed to translate any of the plurality of structures into the interchange structure.

44. In a system for interchanging documents between document processing systems, a method of automatically translating an interchange document structure representing a document during an interchange, the interchange document structure consisting of one or more nestable segments for representing components of the document, into a second document structure representing the document comprising the steps of:

for any segment of the interchange structure, translating the segment into a first component of the second document structure until a nested segment is reached;

translating the nested segment into a second component of the second document structure;

arranging the second component relative to the first component as required by the second document structure; and continuing the translation of the segment.

45. In the method of claim 44 and wherein:

the step of translating the segment of the interchange structure includes saving the state required to translate the segment when the nested segment is reached; and the step of continuing the translation of the segment includes restoring the state required to translate the segment.

46. In the method of claim 44 and wherein:

the second structure is one of a plurality of structures; and the steps of the method are performed by processing means programmed to translate the interchange structure into any of the plurality of structures.

47. In a system for interchanging documents between document processing systems, a method of automatically translating a first document structure representing a document into a second document structure representing the document comprising the steps of:

(1) translating the first document structure into an interchange document structure which represents the document and which consists of one or more nestable segments for representing components of the document by performing steps including (a) for any component of the first document structure, translating the component into a first segment of the interchange document structure and (b) if the component being translated has a dependent component containing information required in the component being translated, translating the dependent component into a second segment of the interchange document structure which is nested at a point in the first segment corresponding to the point in the component being translated where the information is required; and (2) translating the interchange document structure into the second document structure by performing steps including (a) for any segment of the interchange structure, translating the segment into a first component of the second document structure until a nested segment is reached, (b) translating the nested segment into a second component of the second document structure, (c) arranging the second component of the second document structure relative to the first component thereof as required by the second document structure, and (d) continuing the translation of the segment of the interchange structure.

48. In the method of claim 47 and wherein:

step (2) is begun before step (1) is complete and continues concurrently with step (1).

49. In the method of claim 47 and wherein:

the first structure and the second structure belong to a plurality of structures;

the translation of step (I) is performed using processing means programmed to translate one or more of the plurality of structures into the interchange structure; and the translation of step (2) is performed using processing means programmed to translate the interchange structure into one or more of the plurality of structures.

50. In the method of claim 47 and wherein:

the translation of step (1) is performed using first processing means;

the translation of step (2) is performed using second processing means connected to the first processing means via networking means; and the method further includes the step of transferring the interchange structure from the first processing means to the second processing means via the networking means.

51. In the method of claim 50 and wherein: the step of transferring the interchange structure is begun before step (1) is finished and continues concurrently with step (1) and step (2) begins after receiving the beginning of the interchange structure in the second processing means and continues concurrently with step (1) and with the step of transferring the interchange structure.

52. In a system for interchanging documents between document processing systems, apparatus for translating a first document structure representing a documnet into an interchange document structure representing the document and consisting of one or more nestable segments for representing components of the document, the apparatus comprising:

first receiving means for receiving the first document structure;

second receiving means for receiving the interchange document structure, and processing means connected to the first and second receiving means for receiving the first document structure form the first receiving means and responding thereto by, for any component of the first document structure, translating the component into a first segment of the interchange document structure and if the component being translated has a dependent component containing information required in the component being translated, translating the dependent component into a second segment of the sequential document structure which is nested at a point in the first segment corresponding to the point in the component being translated where the information is required and providing the interchange document structure thus produced to the second receiving means.

53. In a system for interchanging documents between document processing systems, apparatus for translating an interchange document structure representing a document and consisting of one or more nestable segments for representing components of the document into a second document structure representing the document comprising:

first receiving means for receiving the interchange document structure, second receiving means for receiving the second document structure; and processing means connected to the first and second receiving means for receiving the interchange document structure from the first receiving means and responding thereto by sequentially translating any segment of the interchange structure into a first component of the second document structure until a nested segment is encountered, suspending translation of the segment containing the nested segment, sequentially translating the nested segment into a second component of the nested structure, arranging the second component relative to the first component as required by the second document structure, and resuming translation of the segment and providing the second document structure thus produced to the second receiving means.

54. In a system for interchanging documents between document processing systems, apparatus for translating a first document structure representing a document into a second document structure representing the document comprising:

(1) first receiving means for receiving the first structure;

(2) extraction means connected to the first receiving means and responsive to the first structure for producing an interchange document structure representing the document and consisting of one or more nestable segments for representing components of the document by, for any component of the first document structure, translating the component into a first segment of the interchange document structure and if the component being translated has a dependent component containing information required in the component being translated, translating the dependent component into a second segment of the sequential document structure which is nested at a point in the first segment corresponding to the point in the component being translated where the information is required;

(3) second receiving means connected to the extraction means for receiving the interchange structure;

(4) composition means connected to the second receiving means and responsive to the interchange structure for receiving the interchange structure and producing the second structure therefrom by sequentially translating any segment of the interchange structure into a first component of the second document structure until a nested segment is encountered, suspending translation of the segment containing the nested segment, sequentially translating the nested segment into a second component of the nested structure, arranging the second component relative to the first component as required by the second document structure, and resuming translation of the segment; and (5) third receiving means connected to the composition means for receiving the second structure, whereby the first structure is translated into the second structure.

55. In the apparatus of claim 54 and wherein:
the composition means begins producing the second structure before the extraction means is finished producing the interchange structure.

56. In the apparatus of claim 54 and wherein:
the first receiving means and the extraction means are included in a first document processing system;
the third receiving means and the composition means are included in a second document processing system; and
the second receiving means includes network means connecting the first document processing system and the second document processing system.

57. In the apparatus of claim 56 and wherein:
the second receiving means begins providing the interchange structure to the network means before the extraction means has finished producing the interchange structure; and
the composition means begins producing the second structure before it has received all of the interchange structure from the network means.

* * * * *